United States Patent
Dylewski, II et al.

(10) Patent No.: US 12,220,975 B2
(45) Date of Patent: Feb. 11, 2025

(54) TONNEAU COVER CLAMP SHIM AND CLAMP SUPPORT

(71) Applicant: Leer Group, Elkhart, IN (US)

(72) Inventors: Eugene A. Dylewski, II, Granger, IN (US); Tommy C. Brock, Nappanee, IN (US)

(73) Assignee: Leer Group, Elkhart, IN (US)

( * ) Notice: Subject to any disclaimer, the term of this patent is extended or adjusted under 35 U.S.C. 154(b) by 0 days.

(21) Appl. No.: 18/502,185

(22) Filed: Nov. 6, 2023

(65) Prior Publication Data
US 2024/0066964 A1 Feb. 29, 2024

Related U.S. Application Data

(63) Continuation of application No. 17/676,435, filed on Feb. 21, 2022, now Pat. No. 11,807,089.

(60) Provisional application No. 63/162,816, filed on Mar. 18, 2021, provisional application No. 63/154,215, filed on Feb. 26, 2021.

(51) Int. Cl.
*B60J 7/19* (2006.01)

(52) U.S. Cl.
CPC ................................ *B60J 7/198* (2013.01)

(58) Field of Classification Search
CPC ... B60J 7/198; B60J 7/196; B60J 7/141; B60J 7/104; B60J 7/068; B60J 10/90; F16B 2001/0092; F16B 2/14
USPC ........... 296/121, 100.07, 136.03; 248/231.61
See application file for complete search history.

(56) References Cited

U.S. PATENT DOCUMENTS

| | | | | |
|---|---|---|---|---|
| 3,641,473 A | * | 2/1972 | Attaway | H01R 11/24 439/923 |
| 5,048,999 A | * | 9/1991 | Wurl | F16B 5/0607 403/374.2 |
| 5,121,960 A | * | 6/1992 | Wheatley | B60J 7/104 296/100.18 |
| 5,275,458 A | * | 1/1994 | Barben | B60J 7/104 296/100.18 |
| 5,460,423 A | * | 10/1995 | Kersting | B60J 7/104 296/100.18 |
| 5,584,521 A | * | 12/1996 | Hathaway | B60J 7/104 296/36 |
| 5,765,902 A | * | 6/1998 | Love | B60J 7/104 248/228.1 |
| 5,860,691 A | * | 1/1999 | Thomsen | B60J 7/08 296/100.18 |
| 6,109,681 A | * | 8/2000 | Edwards | B60J 7/1621 296/100.1 |
| 11,807,089 B2 | * | 11/2023 | Dylewski, II | B60J 7/198 |
| 2008/0289158 A1 | * | 11/2008 | Boulard | B60J 7/104 296/136.03 |

(Continued)

*Primary Examiner* — Amy R Weisberg
*Assistant Examiner* — Veronica M Shull
(74) *Attorney, Agent, or Firm* — Barnes & Thornburg LLP

(57) ABSTRACT

A clamp assembly for use with a tonneau cover assembly is provided. Illustratively, the clamp assembly may include a first clamp member, a second clamp member, a clamp fastener, and at least one shim. The second clamp member is located opposite the first clamp member to form a space located therebetween. The clamp fastener is extended through the space between the first clamp member and the second clamp member. The at least one shim is located in the space between the first clamp member and the second clamp member.

19 Claims, 23 Drawing Sheets

(56) References Cited

U.S. PATENT DOCUMENTS

2022/0185169 A1* 6/2022 Luo .......................... B60P 7/02

* cited by examiner

TONNEAU COVER CLAMP SHIM AND CLAMP SUPPORT

RELATED APPLICATIONS

The present application relates to and claims priority to application Ser. No. 17/676,435, issuing as U.S. Pat. No. 11,807,089, U.S. Provisional Patent Application Ser. No. 63/154,215, filed on Feb. 26, 2021, entitled "Tonneau Cover Clamp Shim and Clamp Support," and U.S. Provisional Patent Application Ser. No. 63/162,816, filed on Mar. 18, 2021, entitled "Tonneau Cover Clamp Shim and Clamp Support—2. The subject matter disclosed in these applications are hereby expressly incorporated into the present application in their entireties.

TECHNICAL FIELD AND SUMMARY

The present disclosure relates to tonneau cover assemblies for use on the cargo box of a pickup truck and, particularly, to shims and clamp supports used in conjunction with a tonneau cover clamp to secure a rail to the sidewall of the cargo box.

The sidewalls of certain pickup truck cargo boxes are made from multiple sheets of steel. In some instances, an outer wall of sheet metal forms the exterior surface of the cargo box. That outer metal sheet is typically folded over to form the outer skin, top, and a downward-depending inner flange edge of the cargo box sidewall. A second inner metal sheet is placed adjacent the outer sheet metal inside the cargo box. This inner metal sheet is likewise bent to form not only the inner sidewall, but also an inner top and flange edge, like the outer metal sheet. Lastly, there is often a plastic cap member that is placed and secured onto the top of the cargo box sidewall to form the top surface of the sidewall. This cap also extends to form a top inner flange edge of the cargo box sidewall. The net result is that the inner top edge area of the cargo box is composed of two sheet metal flanges and one plastic cap flange edge. It is these flanges that a tonneau cover rail will clamp onto in order to secure to the cargo box sidewall.

When the cargo box is manufactured, however, these outer and inner metal sheets, that form the cargo box sidewall, top, and inner edge, have a tolerance run out at that inner edge. This means that because the exact size of each metal sheet may vary slightly, it is not a problem because the inner top edge of the cargo box sidewalls accommodates those slightly different sized metal sheets. For example, if the outer metal sheet is slightly oversized and the inner metal sheet is slightly undersized, a space or gap is created between the flange edges of the inner and outer metal sheets at the top inner edge area of the sidewall. Depending on the size variation between the outer and inner metal sheets, the size of the gap may be relatively large or small. Presumably, if both sheets are properly sized, there will be no gap between the outer and inner sheets.

The same thing occurs between the outer metal sheet flange and top cap flange. Depending on whether the outer metal sheet is slightly undersized or oversized will determine the extent of a gap between the outer metal sheet flange and the top cap flange. Accordingly, multiple gaps may exist between these several flanges. Because the flanges are downward-depending at the top inner sidewall of the cargo box, the gaps are not typically in view. One would have to look upward from underneath the sidewall to see the gaps. As such, this design is an effective way to manufacture a cargo box sidewall—except to the extent these flanges are used as a clamping structure for a tonneau cover rail clamp.

Inconsistent spacing that may occur between these inner and outer metal sheets (and plastic cap) creates a challenge for clamping a tonneau cover rail to the cargo box. Because these flanges extend downward (from about 12 mm to about half an inch) to form the inner edge area of the cargo box top sidewalls, and the gap between each flange varies from truck to truck, the rail clamp has a difficult time securing to those flanges. Indeed, depending on the spacing between the flanges, the tonneau cover clamp might not securely clamp onto the flanges at all. Rather, the clamps may be easily pried-off of the flanges about the axis of the rail.

An illustrative embodiment of the present disclosure provides a clamp assembly for use with a tonneau cover assembly. The clamp assembly includes a clamp mount, a clamp back, a clamp fastener, and at least one shim. The clamp back is located opposite the clamp mount to form a space located therebetween. The clamp fastener is extended through the space between the clamp mount and the clamp back. The clamp fastener couples the clamp mount to the clamp back. The at least one shim is located in the space between the clamp mount and the clamp back and includes an opening located at a side and extends to a fastener slot. The clamp fastener extends through the fastener slot in the at least one shim. At least a portion of the at least one shim is configured to fit between flanges of a cargo box sidewall.

In the above and further embodiments, the clamp assembly may further comprise: a cut out disposed through the at least one shim and extends from the fastener slot; the cut out extends transverse from the fastener slot; a second shim, wherein the second shim includes an opening located at a side and extends to a fastener slot in the second shim, wherein the second shim is located adjacent the at least one shim between the clamp mount and the clamp back; the at least one shim has a first thickness and the second shim has a second thickness, wherein the first thickness is different than the second thickness; the first thickness of the at least one shim is greater than the second thickness of the second shim; the first thickness of the at least one shim is less than the second thickness of the second shim; a plurality of shims, wherein each of the plurality of shims includes an opening located at a side and extends to a fastener slot disposed through the each of the plurality of shims, wherein the plurality of shims is located between the clamp mount and the clamp back; the at least one shim is a rectangular panel; and the at least one shim has a uniform thickness.

Another illustrative embodiment of the present disclosure provides a clamp assembly for use with a tonneau cover assembly. The clamp assembly includes a first clamp member, a second clamp member, a clamp fastener, and at least one shim. The second clamp member is located opposite the first clamp member to form a space located therebetween. The clamp fastener is extended through the space between the first clamp member and the second clamp member. The at least one shim is located in the space between the first clamp member and the second clamp member. The at least one shim includes an opening located at a side and extends to a fastener slot in the at least one shim. The clamp fastener extends through the fastener slot in the at least one shim.

In the above and further embodiments, the clamp assembly may further comprise: a cut out disposed through the at least one shim and extends from the fastener slot; the cut out extends transverse from the fastener slot; a second shim, wherein the second shim includes an opening located at a side and extends to a fastener slot in the second shim, wherein the second shim is located adjacent the at least one shim between the first clamp member and the second clamp member; the at least one shim has a first thickness and the second shim has a second thickness, wherein the first thickness is different than the second thickness; the first thickness of the at least one shim is greater than the second thickness of the second shim; the first thickness of the at least one shim is less than the second thickness of the second shim; a plurality of shims, wherein each of the plurality of shims include an opening located at a side and extends to a fastener slot disposed through the each of the plurality of shims, wherein the each of the plurality of shims is located between the first clamp member and the second clamp member; and the at least one shim has a uniform thickness.

Another illustrative embodiment of the present disclosure provides a clamp assembly for use with a tonneau cover assembly. The clamp assembly includes a first clamp member, a second clamp member, a clamp fastener, and at least one shim. The second clamp member is located opposite the first clamp member to form a space located therebetween. The clamp fastener is extended through the space between the first clamp member and the second clamp member. The at least one shim is located in the space between the first clamp member and the second clamp member. At least a portion of the at least one shim is configured to fit between flanges of a cargo box sidewall.

Additional features and advantages of the shims and clamp support assemblies will become apparent to those skilled in the art upon consideration of the following detailed descriptions exemplifying embodiments of carrying out the shims and clamp support assemblies as presently perceived.

BRIEF DESCRIPTION OF THE DRAWINGS

The concepts described in the present disclosure are illustrated by way of example and not by way of limitation in the accompanying figures. For simplicity, and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

Figure 1:
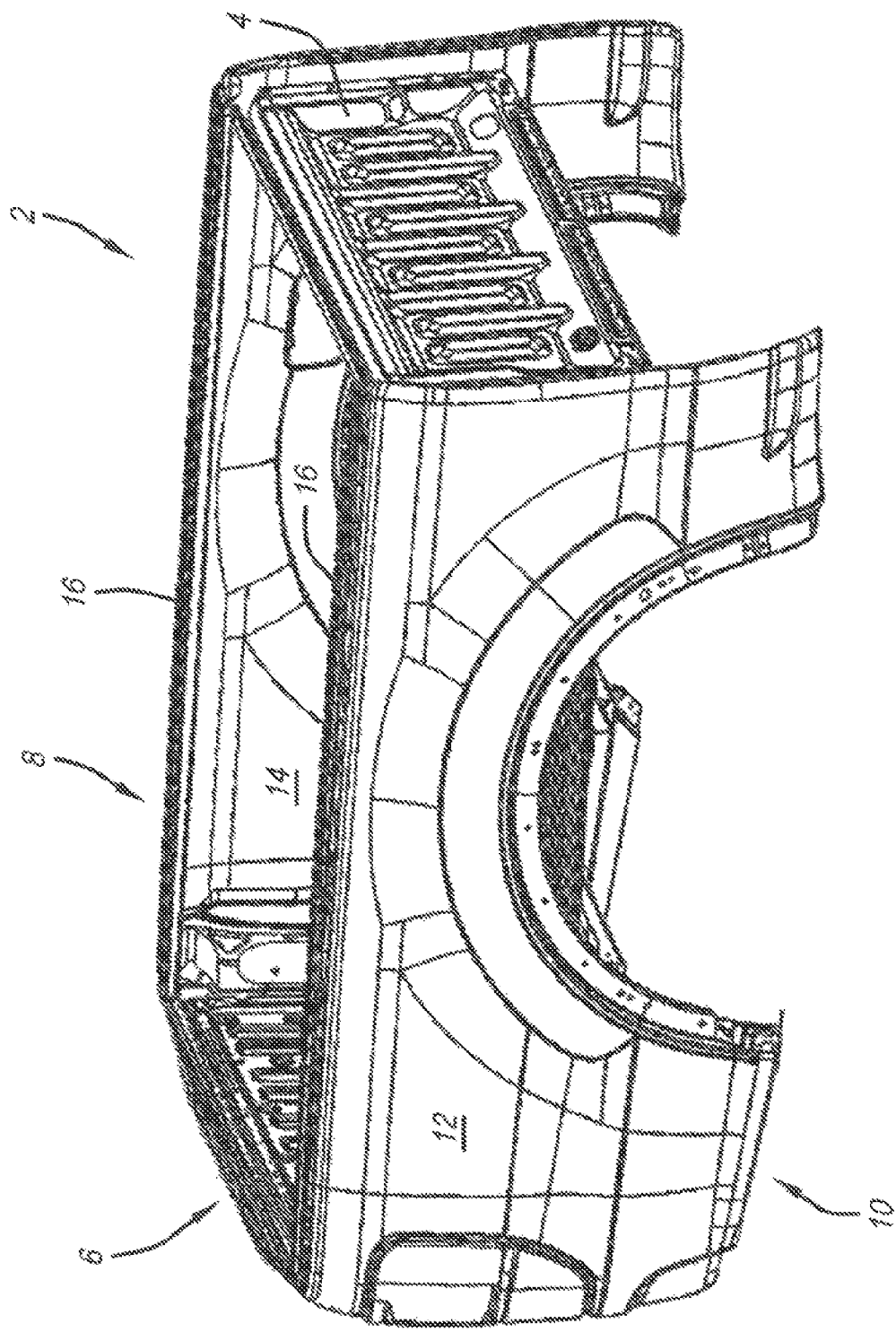
FIG. 1 is a perspective view of a cargo box.

Corresponding reference characters indicate corresponding parts throughout the several views. The exemplification set out herein illustrates embodiments of the shims and clamp support assemblies and such exemplification is not to be construed as limiting the scope of the shims and clamp support assemblies in any manner.

DETAIL DESCRIPTION OF THE DRAWINGS

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Accordingly, an illustrative embodiment of the present disclosure provides at least one shim, or a plurality of shims, as needed, to be placed between either one or both of the gaps between the flanges. By filling the gaps with one or more shims, a solid structure is formed that the clamp is able to clamp onto. The shims may further have a length extending from the clamp jaws to the clamping fastener. The clamping fastener may assist holding the shim or shims in place. In some instances the clamping fastener may act as a lever to push the shims upward while the clamp is being secured. Furthermore, the clamp may be engageable with the clamp screw to inhibit rotation of the shim or shims while the clamping fastener is rotating to secure the clamping jaws to the flanges of the cargo box sidewall. This assists in ease of installation.

Another illustrative embodiment of the present disclosure provides an alternate solution for preventing the clamp from rotating out about the axis of the rail when securing to the cargo box sidewall. In this embodiment, a support bracket is illustratively attached to both the inner sidewall sheet of the cargo box and to the clamp. By fixing the bracket at these two points, the clamp is prevented from rotating about the rail, and thus, prying off same.

A perspective view of a cargo box 2 is shown and FIG. 1. This cargo box 2 includes a bulkhead panel 4, tailgate 6, and sidewalls 8 and 10. Some versions of the sidewalls, such as sidewalls 8 and 10 shown here, are made from inner and outer skins or sheets of metal such as steel. For cargo box 2, each of sidewalls 8 and 10 are composed of an outer sheet 12 and inner sheet 14 (see also FIG. 2). Additionally, sidewalls 8 and 10 may further include a sidewall cap 16 that serves as the top surface of the sidewalls.

Figure 2:
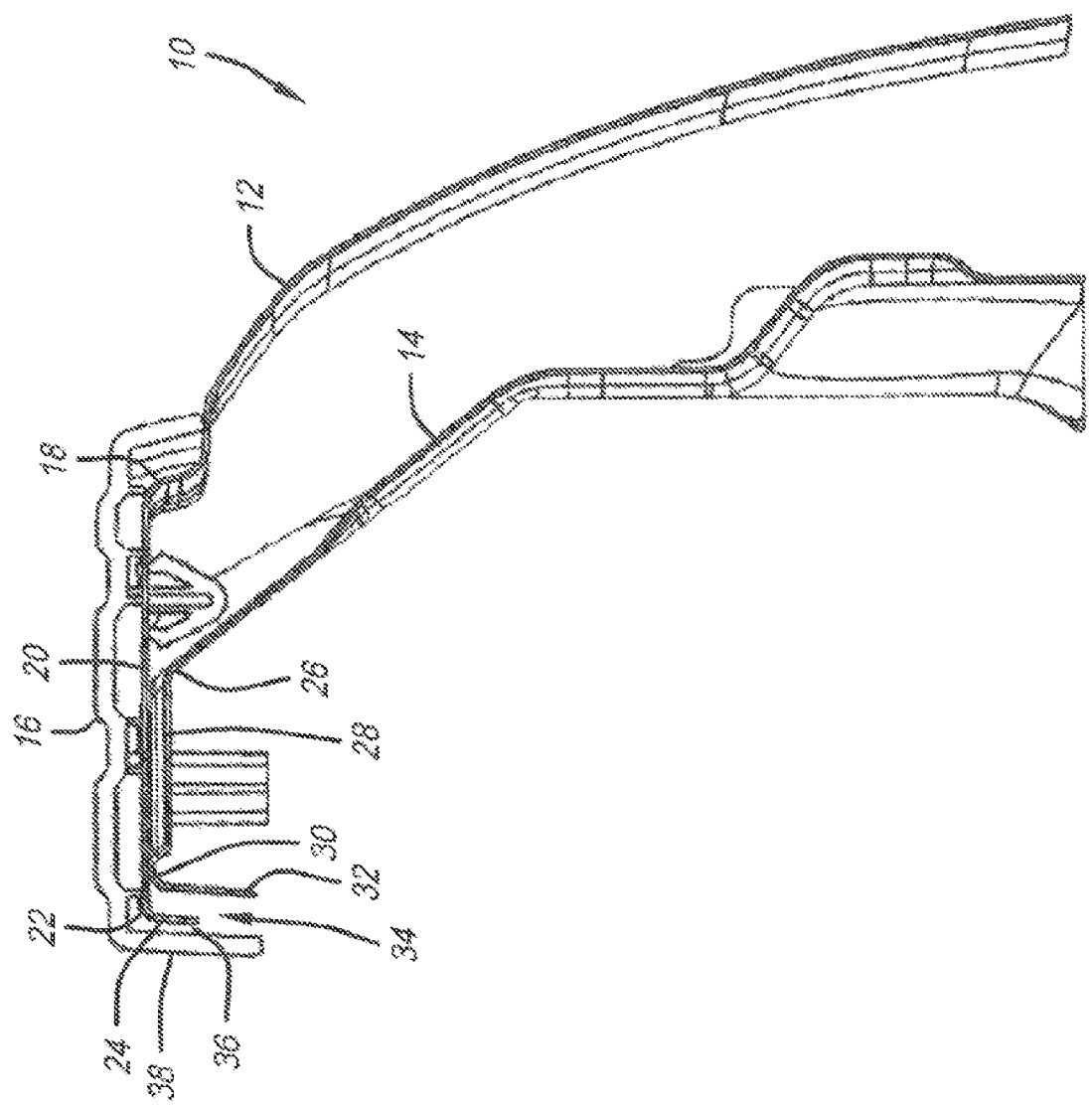
FIG. 2 is a cross-sectional view of a sidewall portion of the cargo box.

To further illustrate, a cross-sectional view of sidewall 10 is shown in FIG. 2. Here, outer sheet 12 is shown to form the outer surface of sidewall 10. Outer sheet 12 is also bent at 18 to form a top surface 20 and then bent again at 22 terminating at outer sheet flange 24. Likewise, inner sheet 14 forms the inner surface of sidewall 10. Inner sheet 14 also bends at 26 forming its own top surface 28 then bends again at 30 to form an inner sheet flange 32. This configuration of outer sheet 12 and inner sheet 14 terminate at flanges 24 and 32. This provides both a top structure for sidewall cap 16 to attach to, as well as a tolerance run out for inner and outer sheets 12 and 14, respectively.

With respect to the latter, it is understood that such cargo boxes, such as cargo box 2, is mass-produced. This means many outer sheets 12 and inner sheets 14 are manufactured at a time and then assembled to form many sidewalls 10. It is contemplated that manufacturing several outer sheets 12 (as well as inner sheets 14) may create small differences in size between each sheet manufactured. Thus, during manufacture of outer sheet 12, there may be slight differences in size between each outer sheet 12. Similarly, during manufacture of each inner sheet 14, there may be slight differences in size between each inner sheet 14. At least part of the reason for having top surfaces 26 and 28, as well as flanges 24 and 32, is to accommodate those small variations in size of sheets 12 and 14, respectively. As a consequence, a tolerance run out or gap 34 is created between flanges 24 and 32. There may also be a tolerance run out or gap 36 located between flange 24 of outer sheet 12 and a flange 38 that is part of and depends from sidewall cap 16. It is contemplated, for example, that between different cargo boxes 2, gap 34 may be wider or narrower from this cross sectional perspective depending on the ultimate sizes of outer sheet 12 and inner sheet 14. Likewise, there may be a wider or narrower gap 36 between flanges 24 and 38 for similar reasons. For cargo box sidewalls 8 or 10 on any particular pickup truck, it will not be known how wide or narrow either gaps 34 or 36 will be.

Figure 3:
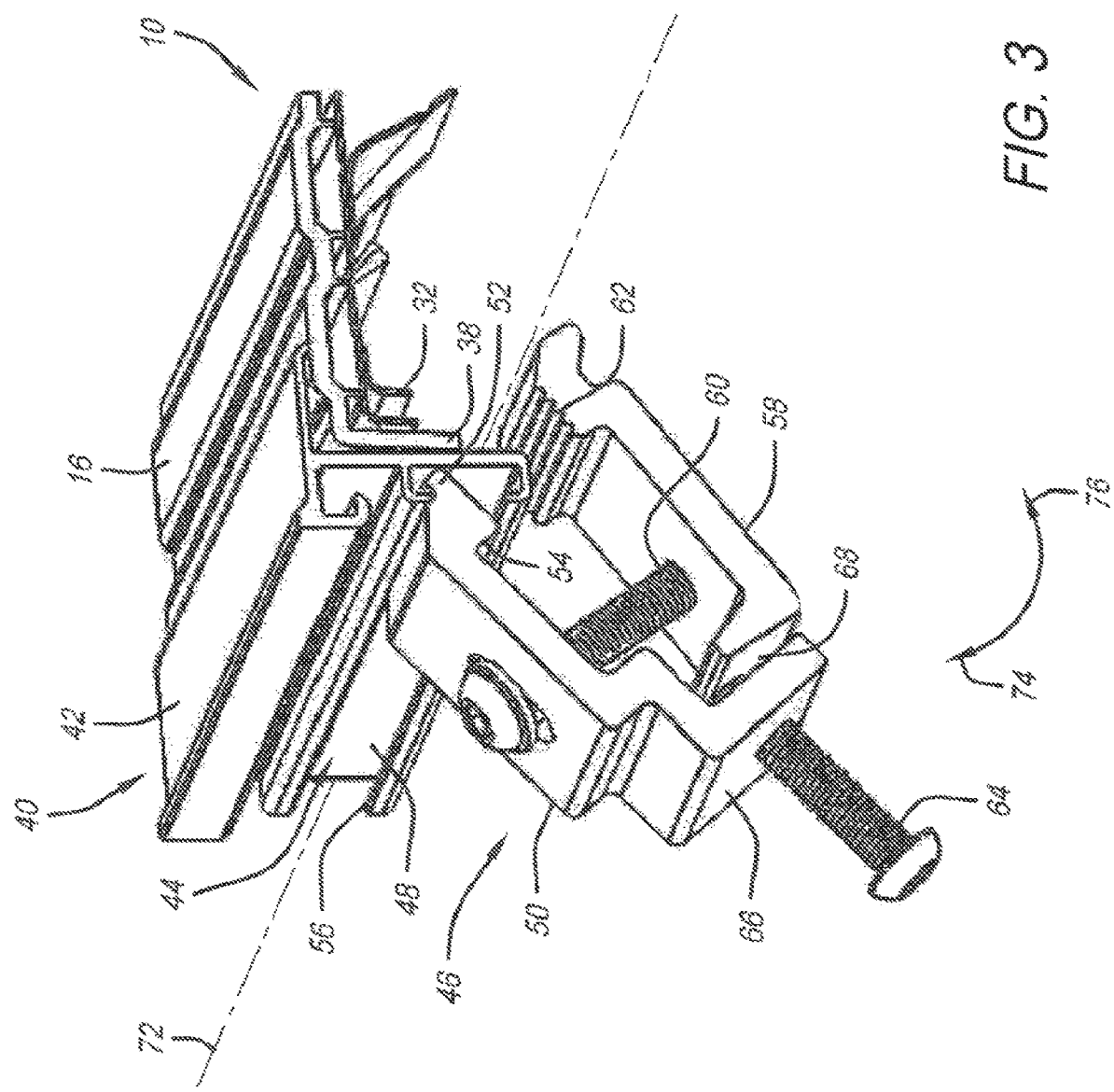
FIG. 3 is a detail perspective view of a portion of the cargo box sidewall along with a portion of a rail and a clamp.

A rail for a tonneau cover is attached to flanges 32 and 38 (sandwiching flange 24). Having such gaps as 34 and 36 make it difficult for the rail to secure onto the sidewall. As shown in the detail perspective view of a portion of sidewall 10 in FIG. 3, for example, a rail 40 with lip plate 42 sets onto sidewall cap 16 with a clamp bracket 44 illustratively depending downwardly adjacent flange 38. It is appreciated that rail 40 is longitudinally extending along the side of sidewall 10. Illustrative cover rails and clamps related to the type disclosed herein may be found in U.S. patent application Ser. No. 16/101,900, entitled "Tonneau Cover" filed on Aug. 13, 2018, and U.S. patent application Ser. No. 16/928,117, entitled "Multi-Panel Tonneau Cover" filed on Jul. 14, 2020, the disclosures of which are herein incorporated by reference in their entireties. It is appreciated that other tonneau cover rails and clamps of differing configurations may be secured onto sidewalls 8 and 10 using structures from this disclosure and are, thus, contemplated to be within the scope of this disclosure. It is further appreciated, that the discussion and descriptions related to sidewall 10 apply equally to sidewall 8 in mirror image and vice versa.

As particularly shown herein, a clamp assembly 46 is in the process of being attached to clamp slot 48. Clamp assembly 46 includes a clamp mount 50 having an upward-extending flange 52 that fits into clamp slot 48 of rail 40. Clamp mount 50 also includes a planar surface 54 that rests on support 56 of rail 40. Opposite clamp mount 50 is clamp back 58 coupled together via clamping fastener 60, which extends therebetween. An illustrative serrated-type gripping surface 62, on clamp back 58, is intended to abut flange 32 when clamping fastener 60 is rotated. This configuration will draw clamp mount 50 and clamp back 58 toward each other. An adjustment screw 64 is disposed through clamp base 66 to engage clamp back base 68 for moving clamp back 58 vertically as needed. This allows clamp assembly 46 to accommodate down-turned flanges of different character on different types of truck bed sidewalls. It is appreciated that clamping fastener 60 may be disposed through a slot 70 which is disposed through clamp mount 50 so clamp back 58 can be moved vertically. It is further appreciated that rail 40 extends along a longitudinal axis 72 about which clamp assembly 46 rotates in directions 74 and 76 to remove from or engage with clamp bracket 44.

Figure 4:
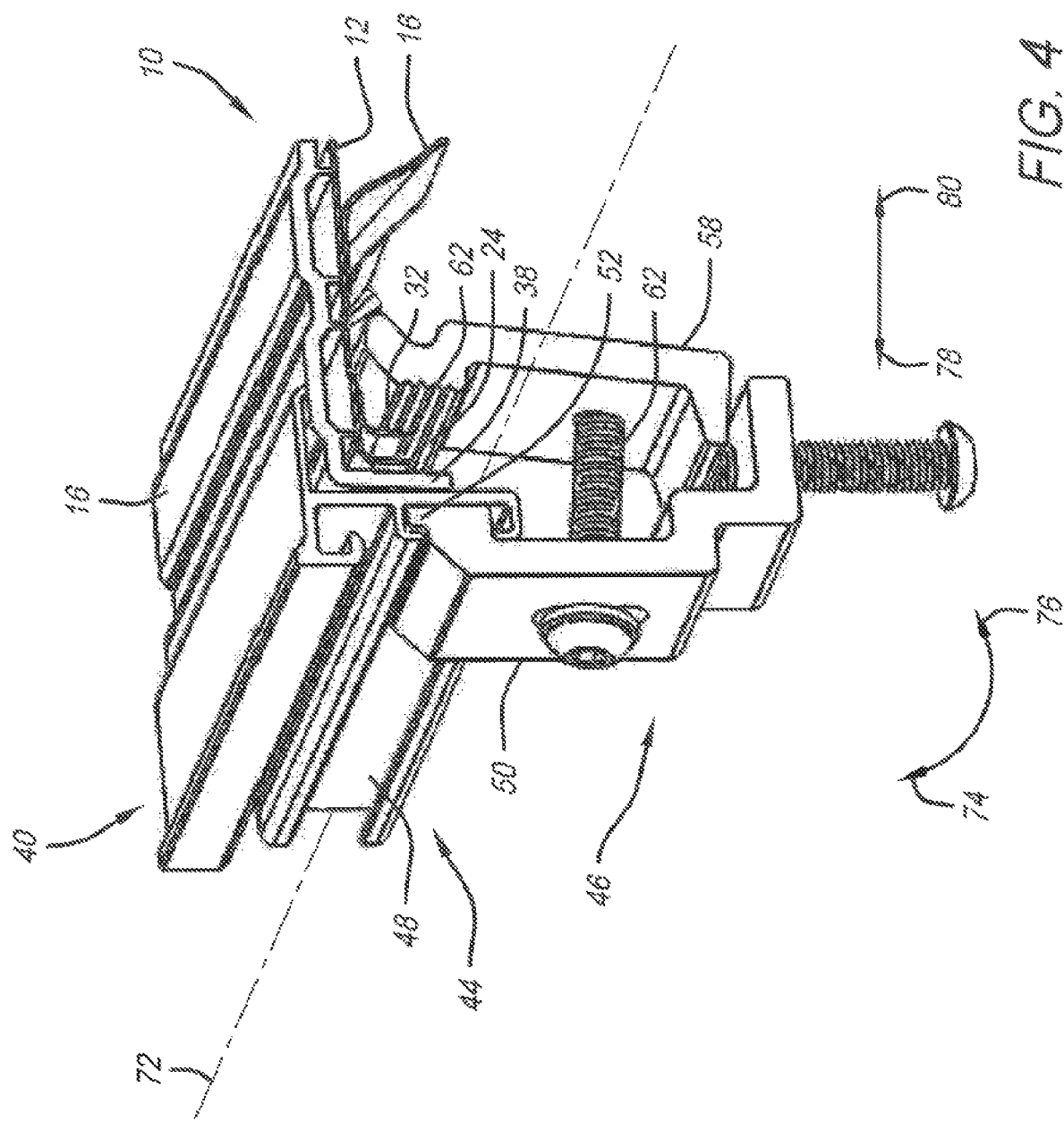
FIG. 4 is another detail perspective view of a portion of the cargo box sidewall with the portion of the rail and clamp.

Another detail perspective view of a portion of sidewall 10 is shown in FIG. 4. Here, clamp assembly 46 has been rotated in direction 76 so flange 52 of clamp mount 50 fits into clamp slot 48 of clamp bracket 44. Also depicted here is clamp back 58 in position so that gripping surface 62 will engage inner sheet flange 32 when clamping fastener 60 pulls clamp back 58 in direction 78 to a clamping position. Longitudinal axis 72 of rail 40 is also shown in this view. In order to secure rail 40 onto sidewall 10, clamp assembly 46 needs to clamp rail 40 against sidewall cap flange 38 of sidewall cap 16 and inner sheet flange 32 with outer sheet flange 24 sandwiched therebetween. It will be appreciated by the skilled artisan upon reading this disclosure that the same clamp and rail assembly may be employed on sidewall 8 as described herein with sidewall 10.

Figure 5:
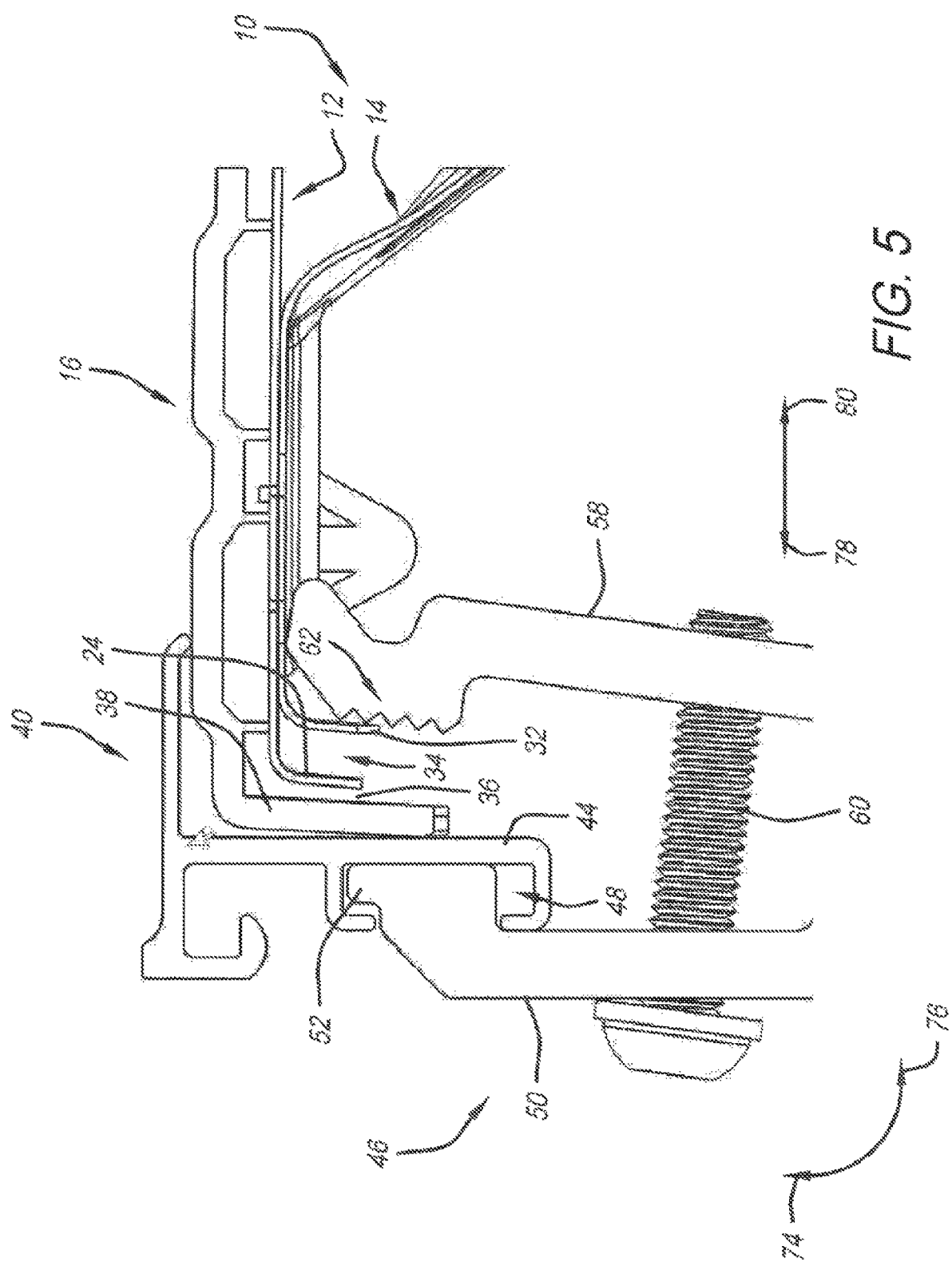
FIG. 5 is a side detail view of a portion of the cargo box sidewall, rail, and clamp.

A side detail view of a portion of sidewall 10 with rail 40 set onto sidewall cap 16 and clamp assembly 46 clamping against inner sheet flange 32 is shown in FIG. 5. Here, clamping fastener 60 has drawn clamp back 58 in direction

78 to create the clamping force. A problem, however, is that gap 34 between flanges 32 and 24, as well as gap 36 between flange 24 and flange 38 create space between flanges 32 and 38 that allow same to move thereby preventing a secure clamping between gripping surface 62 and clamp bracket 44. As clamping fastener 60 draws clamp mount 50 in direction 80 and clamp back 58 in direction 78, gripping surface 62 of clamp back 58 will tend to push flange 32 in direction 78 as well, thereby preventing a secure clamping between rail 40 and sidewall 10. This means that clamp assembly 46 might be easily pried from clamp slot 48 of clamp bracket 44 by pulling in direction 74. It is also conceivable that vibration during movement of the pickup truck may also loosen clamp assembly 46 causing same to disengage from sidewall 10.

Figure 6:
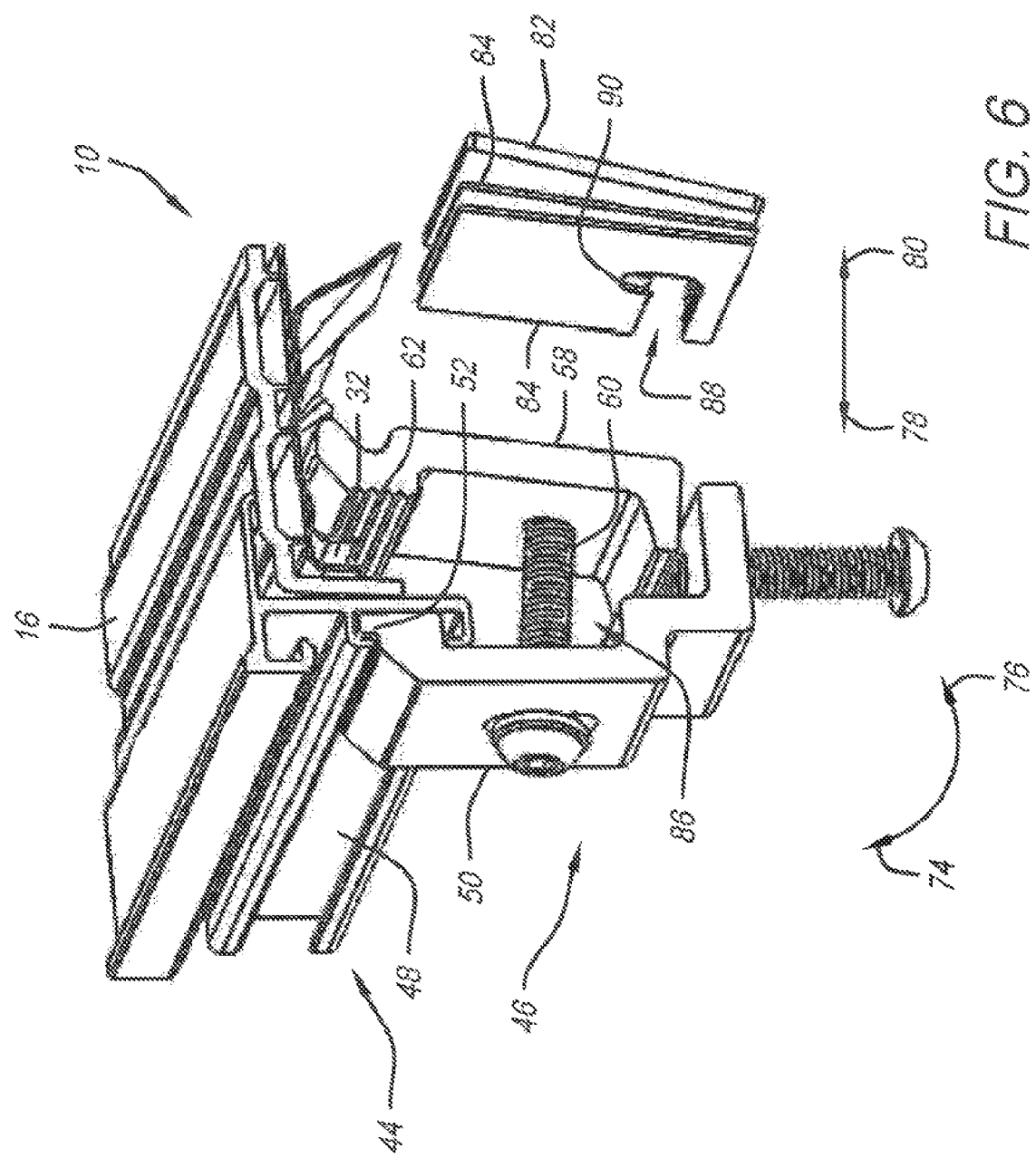
FIG. 6 is a detail perspective view of a portion of a cargo box sidewall, rail, and clamp assembly, along with shims in exploded view.

Another detail perspective view of a portion of sidewall 10 is shown in FIG. 6. This view is similar to that shown in FIG. 4 with clamp assembly 46 having been rotated in direction 76 so upward extending flange 52 of clamp mount 50 fits into clamp slot 48 of clamp bracket 44. Clamp back 58 is also in position so that gripping surface 62 will engage inner sheet flange 32 when clamping fastener 60 pulls clamp back 58 in direction 78 to a clamping position. Further in this view, however, are a plurality of shims 82 and 84 configured to be fitted in gap 86 between clamp mount 50 and clamp back 58, as well as in gaps 34 and 36 (see, also, FIG. 5). The purpose of shims 82 and 84 are to provide a solid surface between flange 32 and flange 38 that clamp assembly 46 may clamp onto. Shims 82 and 84 may have a length extending to clamping fastener 60 to assist with holding shims 82 and 84 in place during installation of clamp assembly 46. Clamping fastener 60 may also act as a lever to push the shims upward while clamp assembly 46 is being secured. In the illustrated embodiment, each of shims 82 and 84 may include a fastener slot 88 and a cut out 90 in communication with fastener slot 88.

Figure 7:
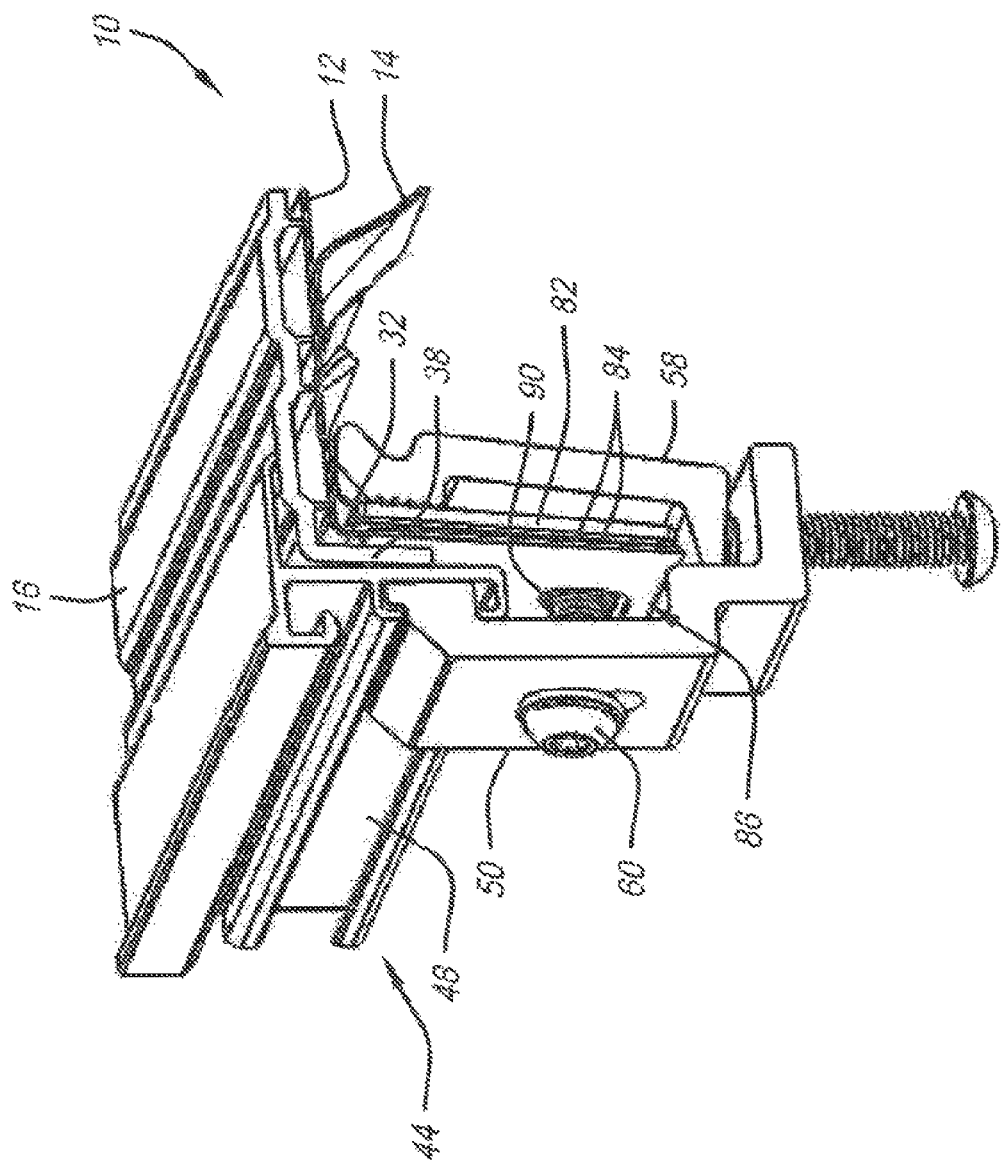
FIG. 7 is another detail perspective view of a portion of a cargo box sidewall, rail, and clamp with shims positioned between flanges of the cargo box sidewall.

As shown in the detail perspective view of a portion of sidewall 10 in FIG. 7, shims 82 and 84 are positioned within gap 86 between clamp mount 50 and clamp back 58. Shims 82 and 84 are also positioned between flange 32 and flange 38 to fill gaps 34 and 36 (see, also, FIG. 8). This, again, provides a solid clamping body between flange 32 and flange 38. Also depicted is clamping fastener 60 disposed in cut out 90 of shims 82 and 84. Having shims extend to clamping fastener 60 extends the length of the clamping body between flange 32 and flange 38, as well as providing a position certain within gap 86 so shims 82 and 84 position properly between flange 32 and 38, which helps in the ease of installation.

Figure 8:
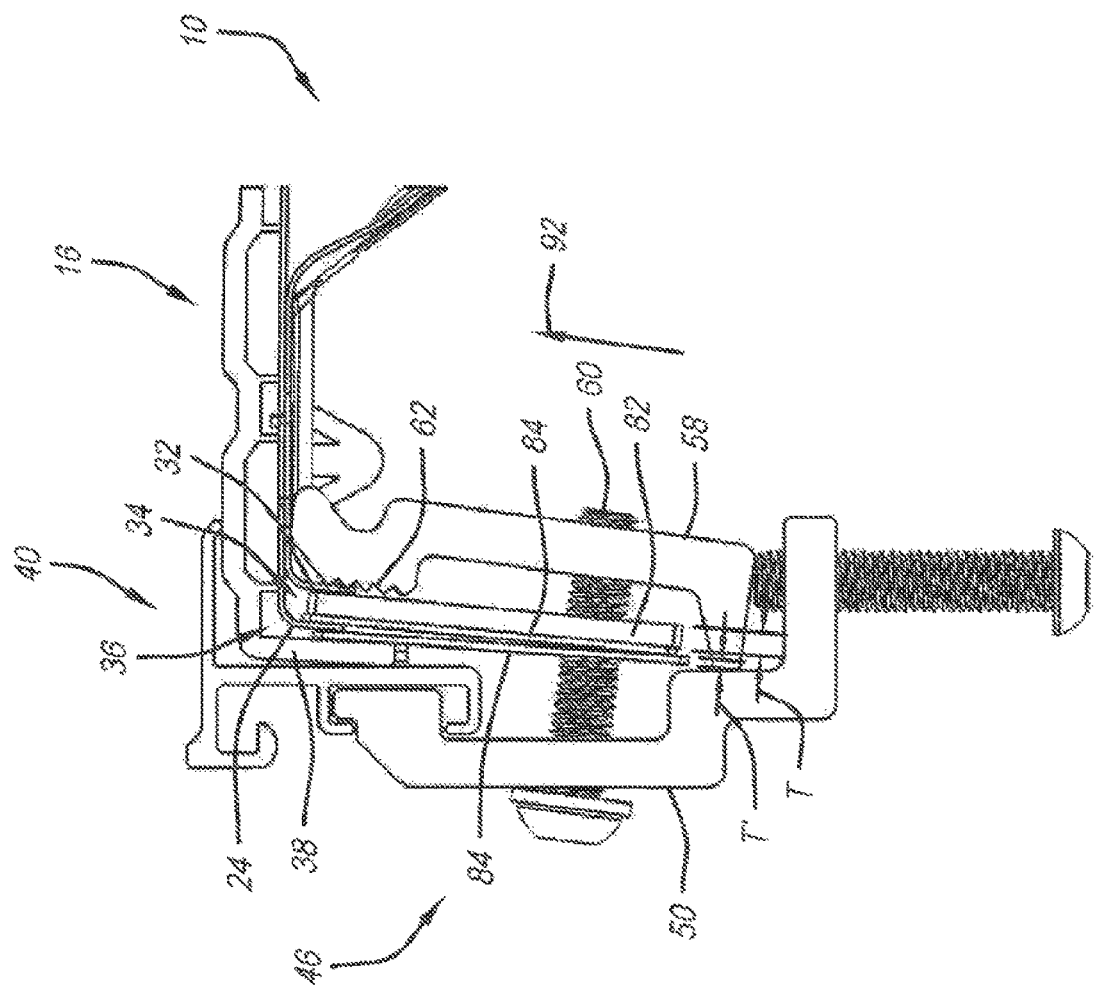
FIG. 8 is an end sectional detail view of a portion of a cargo box sidewall with a rail, clamping assembly, and shims located between flanges of the cargo box sidewall.

An end sectional detail view of a portion of sidewall 10 with clamp assembly 46 clamping rail 40 against flange 38 and flange 32 is shown in FIG. 8. This view shows shim 82 and shim 84 located within gap 34 between flange 32 and flange 24. It is appreciated that shims 82 and 84 effectively fill gap 34 to provide solid body between the flanges. Similarly, a second shim 84 is fitted in gap 36 between flange 24 and flange 38. The combination of the three shims 82, 84, and 84, fill gaps 34 and 36 to create an effectively solid clamping body between flange 32 and flange 38. Having this solid structure better enables clamp assembly 46 to clamp onto sidewall 10. As shown, gripping surface 62 may abut both flange 32 and portion of shim 82. It is, thus, appreciated, that how the length of shims 82 and 84 may serve to enhance the clampability of clamp assembly 46.

It is further appreciated, that shim 82 has a wider thickness T than thickness T' of shim 84. Because the gap sizes or widths of gap 34 and gap 36 may vary because of the tolerance running between outer sheet 12 and inner sheet 14 it will not be known from the outset what the thickness of gap 34 or gap 36 will be that needs filling. Having shims of varying thicknesses, using a combination of same in the gaps, will serve to close same and provide a clampable body or structure. In the case shown here in FIG. 8, the combination of shim 82 with shim 84 provides enough thickness to fill gap 34. In contrast, for gap 36, only a single shim 84 is needed to fill this gap. It is appreciated that any combination and number of such shims may be employed in order to fill gaps 34 and 36 (see, also FIGS. 10 through 15).

This view further depicts clamping fastener 60 disposed through shims 82 and 84 in addition to clamp mount 50 and clamp back 58. It is appreciated that clamping fastener 60 supports shims 82 and 84 to keep them in place. Particularly, by placing clamping fastener 60 in cut out 90, shims 82 and 84 may be held in a generally vertical orientation. Even further, clamping fastener 60 may be used to apply a lever force generally in direction 92 to keep shims 82 and 84 about vertically in place within gaps 34 and 36. Also, while in place about clamping fastener 60, shims 82 and 84 have less propensity to move horizontally. Because fastener slot 88 is open at one end, shims 82 and 84 can be slid over clamping fastener 60 and into place between gaps as needed. This is useful when assembling rail 40 onto sidewall cap 16. With clamp assembly 46 in place, either or both shims 82 and/or 84 may be slid horizontally over clamping fastener 60 through fastener slot 88. This process can be repeated with multiple shims 82 and/or 84 as needed to fill gaps 34 and 36 to create the necessary structure with which clamp assembly 46 may clamp to.

Figure 9:
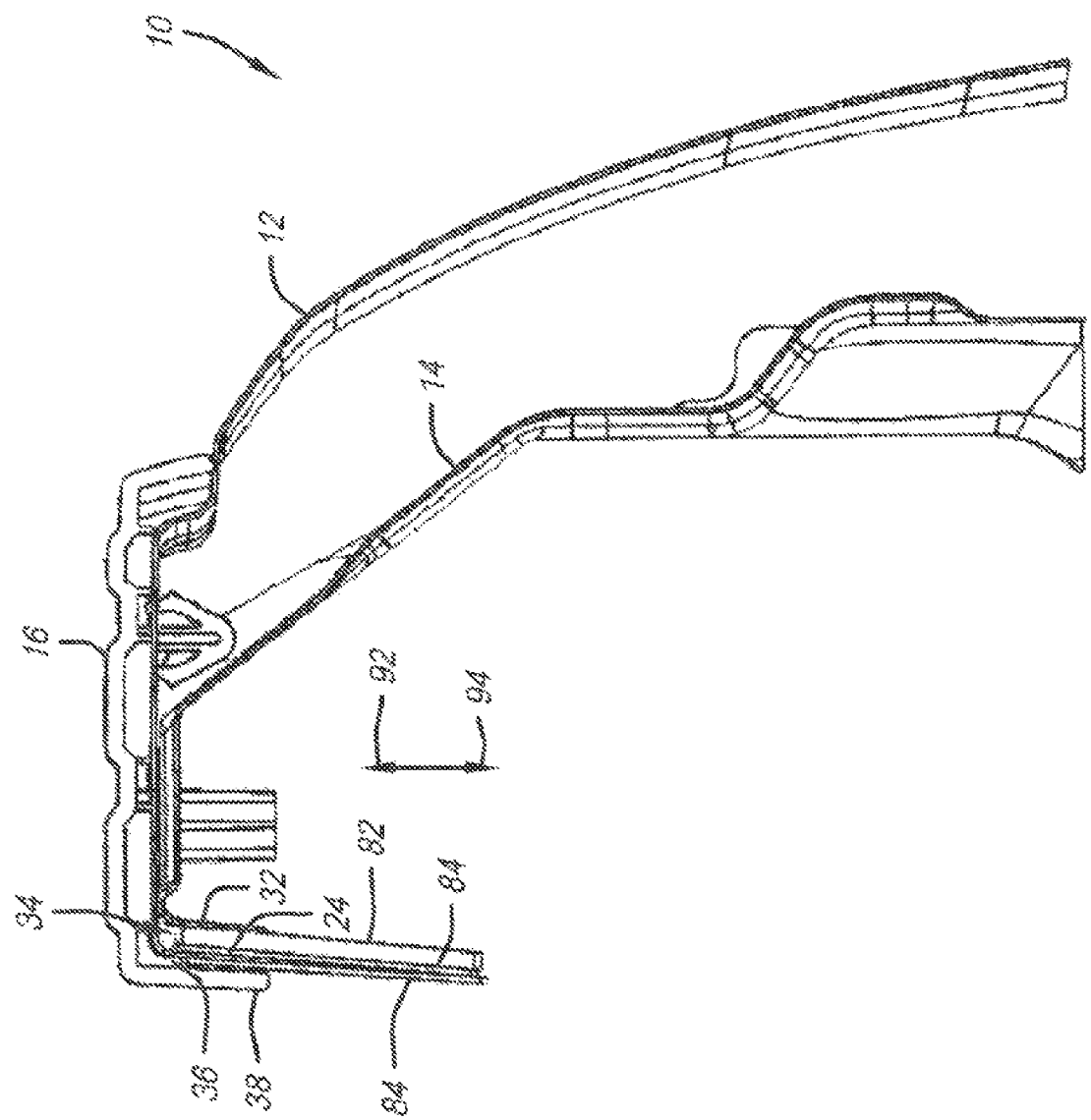
FIG. 9 is an end sectional detail view of a portion of a cargo box sidewall with shims located between flanges of the cargo box sidewall.

Another end sectional detail view of a portion of sidewall 10 is shown in FIG. 9. Substantively, this view is similar to that shown in FIG. 8 except with rail 40 and clamp assembly 46 removed. In this view, it is further appreciated how shims 82 and 84 can fill gaps 34 and 36 between flanges 32, 24, and 38 to create a clampable structure. Between flange 32 and flange 38 there is no longer gaps that allow these flanges to move if a force is applied to them. Furthermore, the solid bodies of shims 82 and 84 extend further downward in direction 94 to essentially extend the clamping body for clamp assembly 46. This occurs while at the same time clamp assembly 46, illustratively, via clamping fastener 60, serves to support shims 82 and 84.

It will be appreciated by the skilled artisan upon reading this disclosure that because it is unknown what the gap size will be for gaps 34 and 36, multiple combinations of shim sets may be employed to fill those gaps regardless of their widths. As shown in this end sectional detail view of a portion of sidewall 10 in FIG. 10, with W of gap 34 between flanges 32 and 24, as well as width W' of gap 36 between flanges 24 and 38, are relatively large. This means that clamp assembly 46 may not be able to grip flange 32 and hold rail 40 in place. That said, any combination of shims 82 and 84 having thicknesses T and T', respectively, that, when combined, generally match the widths W and W' of gaps 34 and 36, respectively, can be employed. In this particular instance, as shown in the end sectional detailed view of a portion of sidewall 10, similar to that shown in FIG. 10, now shown in FIG. 11, shims 82 and 84 are inserted into gap 34 while shim 84 alone is fitted into gap 36. This fills the space between flanges 32 and 38, providing an essentially solid structure with which clamp assembly 46 may clamp onto. It will be further appreciated that due to the varying potential widths of gaps 34 and 36, it may take trial and error to determine how many of either/or shims 82 and/or 84 are needed to fill the particular gap or gaps.

Figure 12:
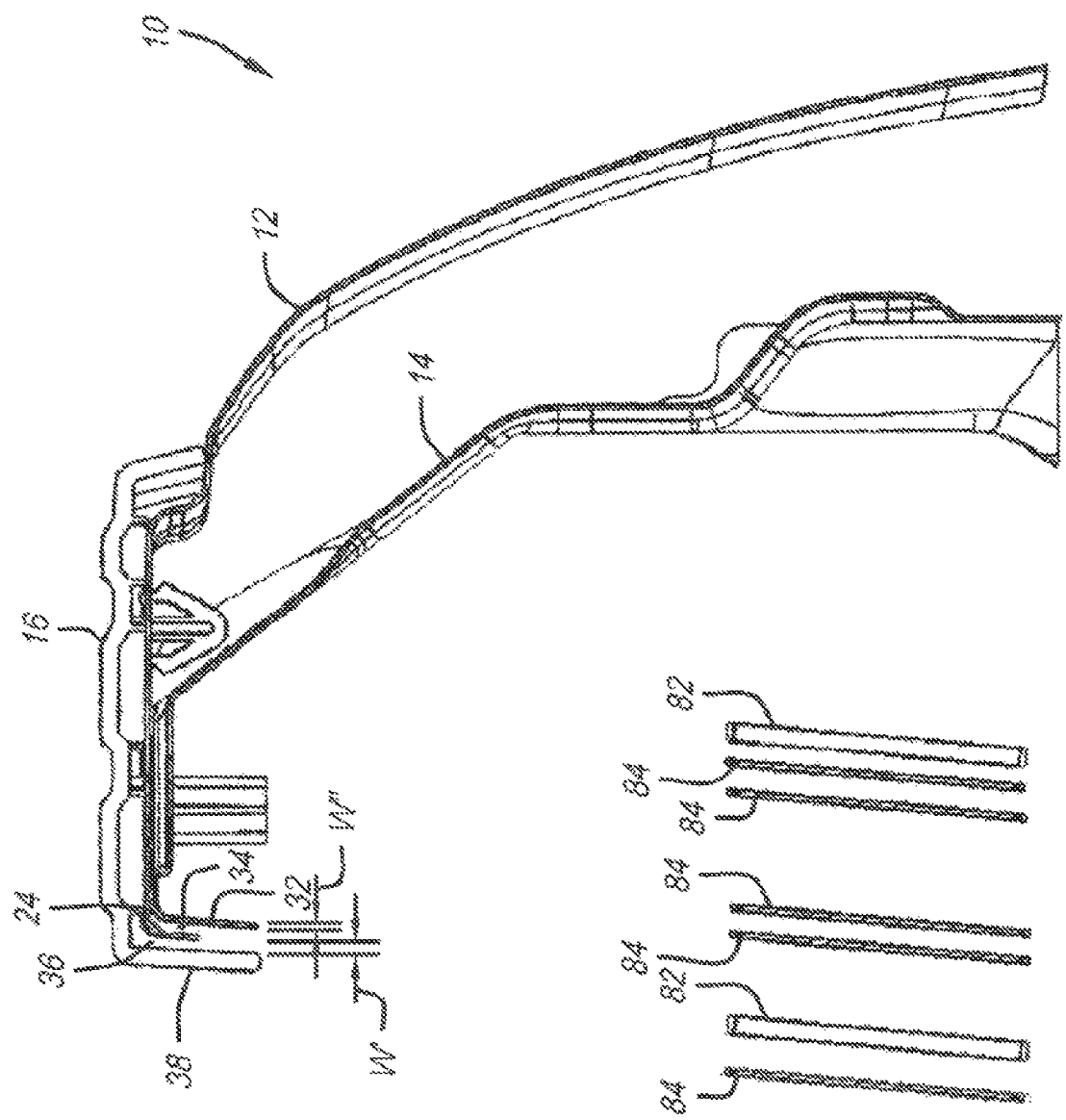
FIG. 12 is an end sectional view of a portion of a cargo box sidewall in addition to multiple shim arrangements shown in exploded view.

As further example, as shown in this end sectional detailed view of a portion of sidewall 10 of FIG. 12, gaps 34 and 36 exist between flanges 32 and 24, as well as flanges 24 and 38. In this case, however, when comparing to gaps 34 and 36 from FIG. 10, now gap 34 has a width W″ which is narrower than with width W. Given this smaller size, it will need to be decided which shim or combination of shims 82 and/or 84 may be used to fill gap 34. As also shown in this view, various combinations of shims 82 and 84 may be employed to fill the gaps of different widths. In this example, however, despite gap 34 having a narrower width W″, gap 36 still has a width W′ similar to that shown in FIG. 10.

Figure 10:
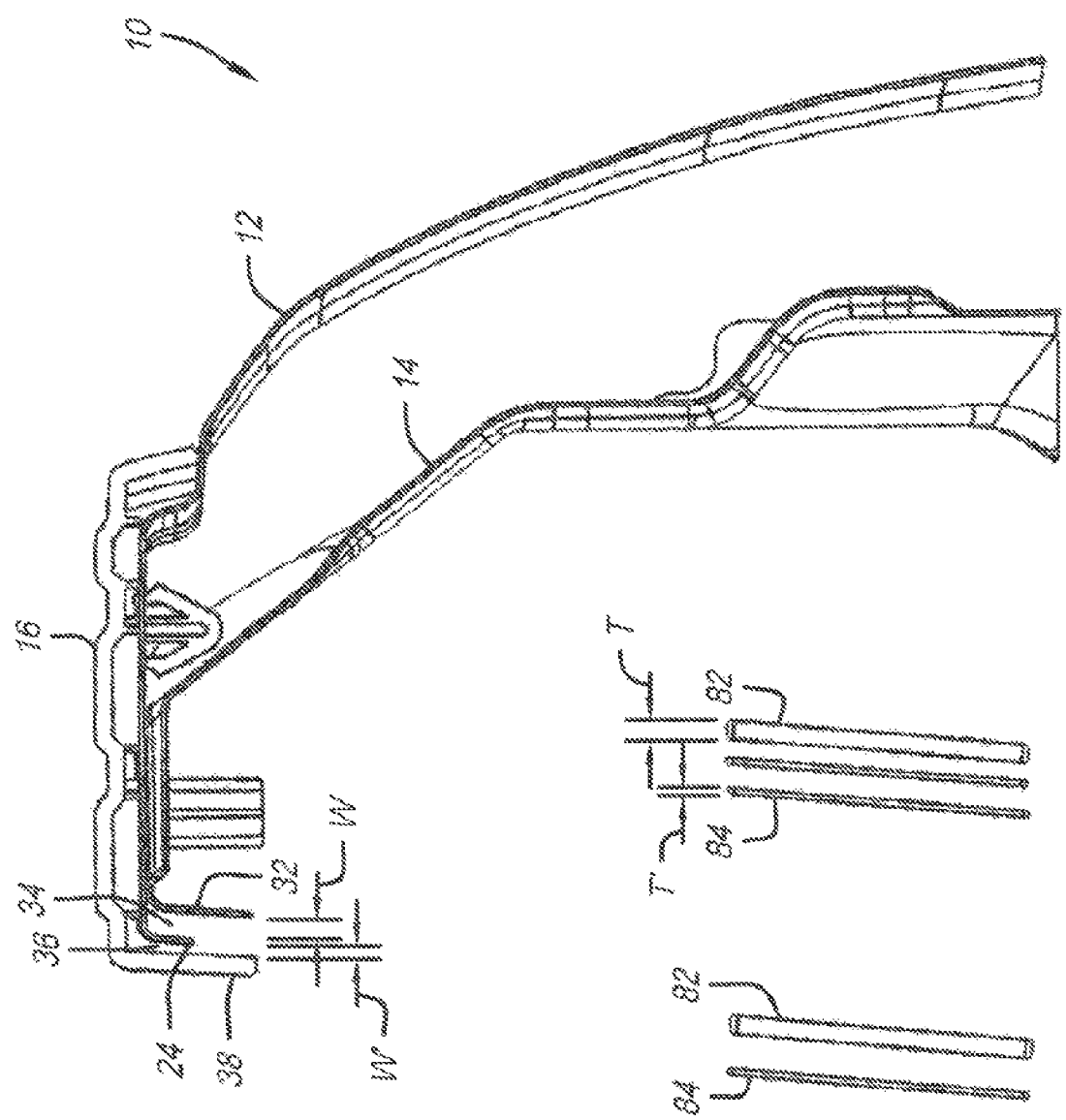
FIG. 10 is an end sectional detail view of a portion of the cargo box sidewall, including multiple shim arrangements in exploded view.
Figure 11:
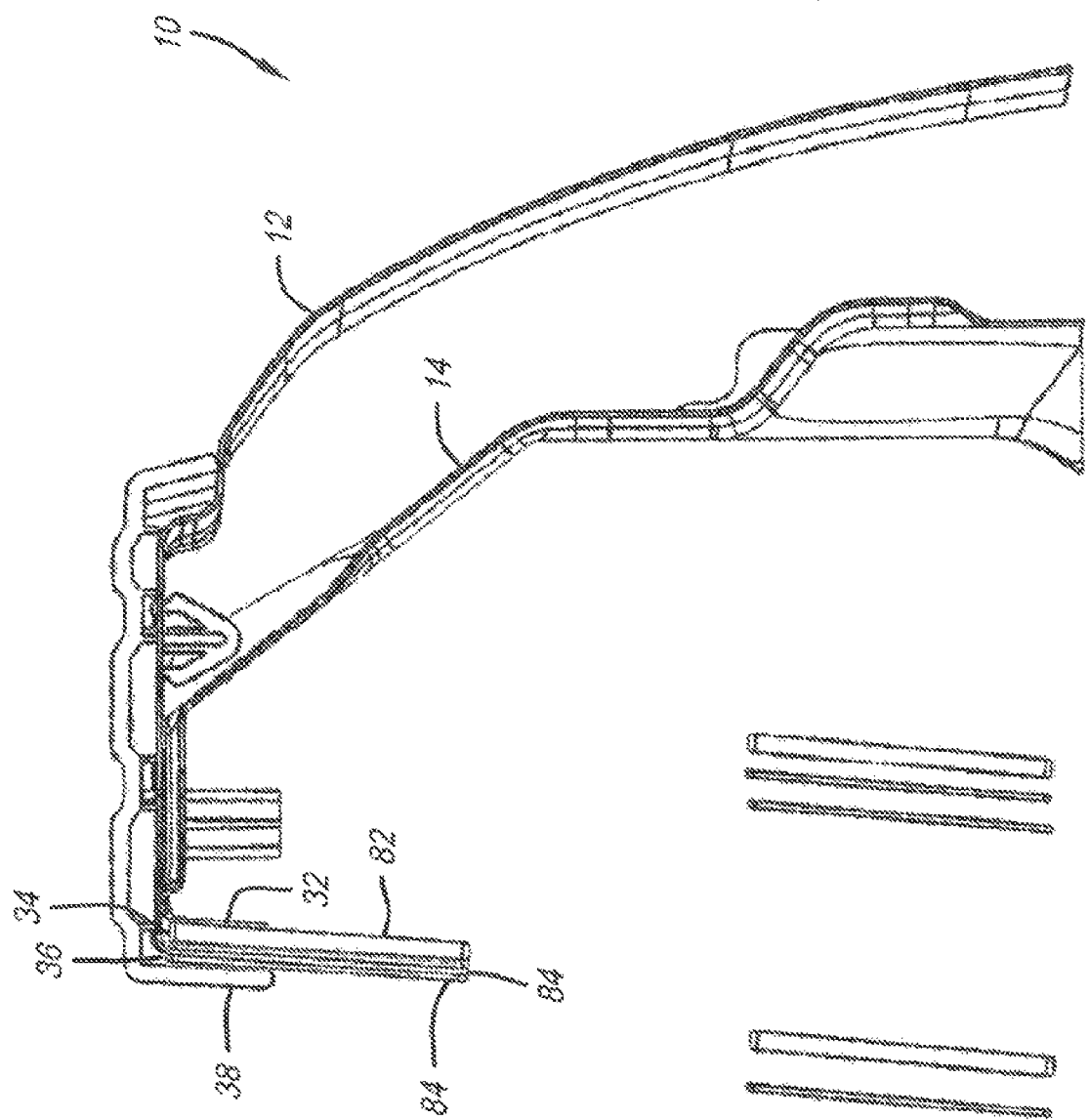
FIG. 11 is an end sectional detail view of a cargo box sidewall with shims located between flanges of the cargo box sidewall and additional multiple shim arrangements in exploded view.
Figure 13:
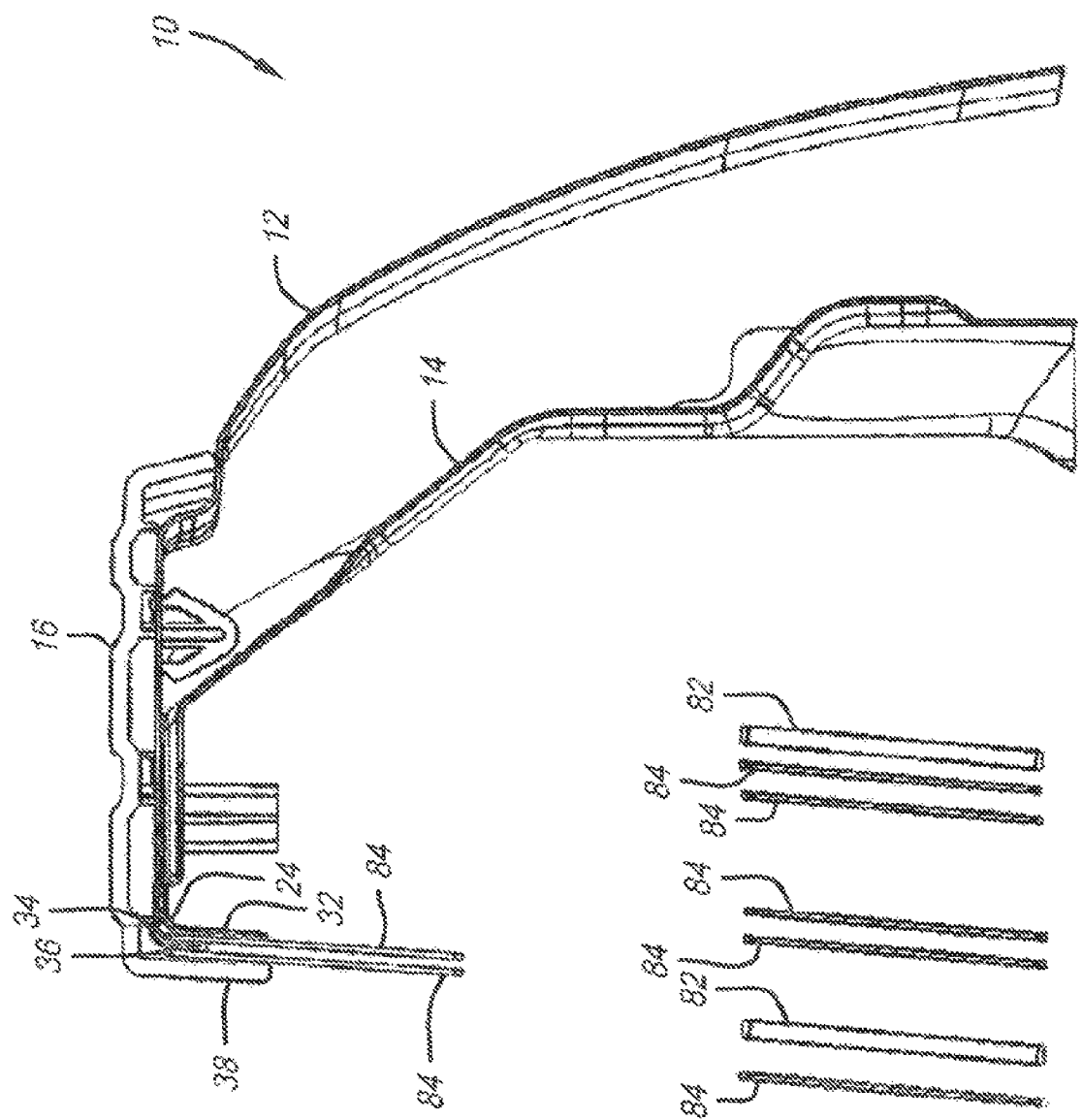
FIG. 13 is an end sectional detail view of a portion of a cargo box sidewall with a shim arrangement located between flanges, as well as other shim arrangements shown in exploded view.

The end sectional detailed view of a portion of sidewall 10 shown in FIG. 13 depicts a shim 84 fitted into gap 34 to fill same having a width W″ (see, FIG. 12), as well as another shim 84 to fit into gap 36, such as was done previously, as shown in FIGS. 10 and 11. In this case, because of the narrow widths only a single thinner shim 84 is needed to create a solid structure between flange 32 and flange 38. With gaps 34 and 36 now filled, clamp assembly 46 has a solid structure with which to clamp onto.

Figure 14:
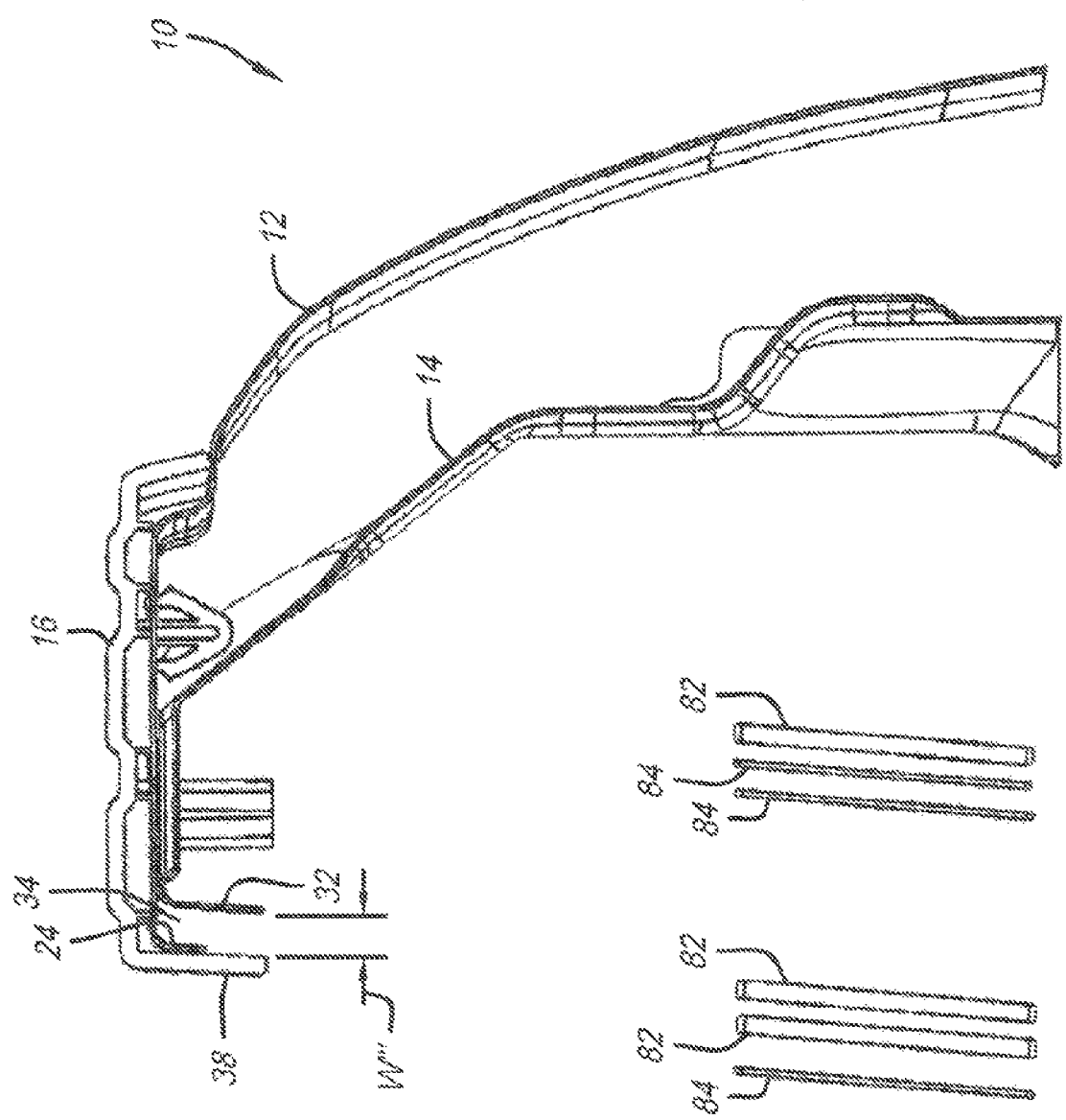
FIG. 14 is an end sectional detail view of a portion of a cargo box sidewall with multiple shim arrangements shown in exploded view.

In still a further example, as shown in the end sectional detail view of a portion of sidewall 10 of FIG. 14, gap 34, located between flange 32 and flange 24, is coincidently even wider than width W from FIG. 10. Width W‴ of gap 34, shown in FIG. 14, may therefore require more shims of shims 82 or 84, in order to create a solid structure. It may require trial and error, possibly one shim 82, as well as two thinner shims 84, or possibly two thicker shims 82 and one thinner shim 84, to be able to fill gap 34.

Figure 15:
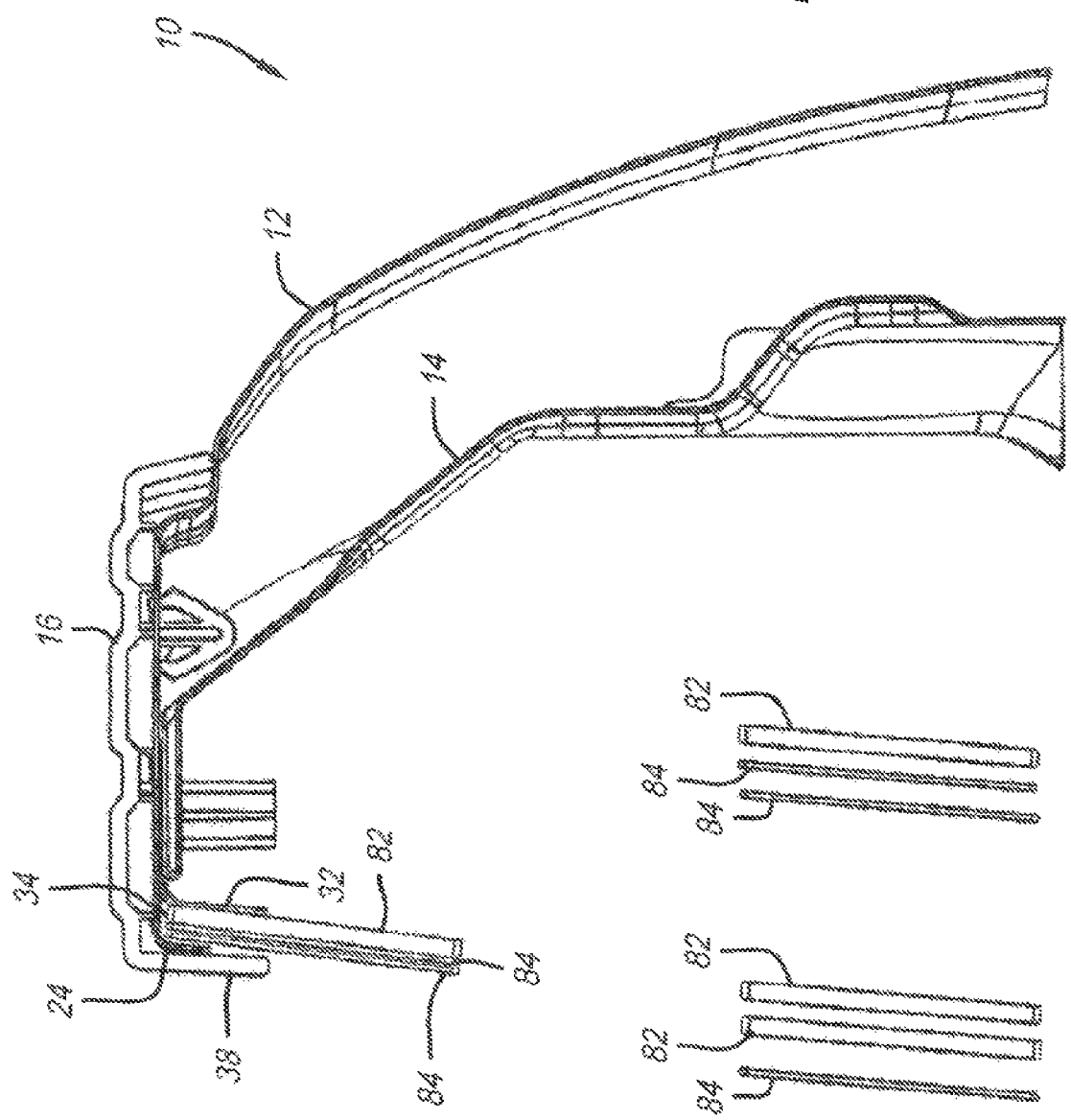
FIG. 15 is an end sectional detail view of a portion of a cargo box sidewall with a shim arrangement installed between flanges and additional shim arrangements shown in exploded view.

As is shown in the end sectional detail view of a portion of sidewall 10 of FIG. 15, it ends up being one thicker shim 82 with two thinner shims 84 that are necessary to fill gap 34 between flange 32 and flange 24. Again, it will be appreciated by the skilled artisan upon reading this disclosure that because it will not necessarily be known how wide the gaps 34 and 36 will be, trial and error by trying multiple shims of varying thicknesses to fill gaps 34 and 36. It is notable in FIGS. 14 and 15 that there is no gap 36. Flange 24 essentially abuts flange 38, leaving no gap 36 requiring to be filled. When there is no such gap, all that is needed is to use whatever combination of shims 82 and/or 84 that will fill gap 34 to provide a solid structure between flange 32 and flange 38 so that clamp assembly 46 may be able to clamp onto the sidewall.

Figure 16:
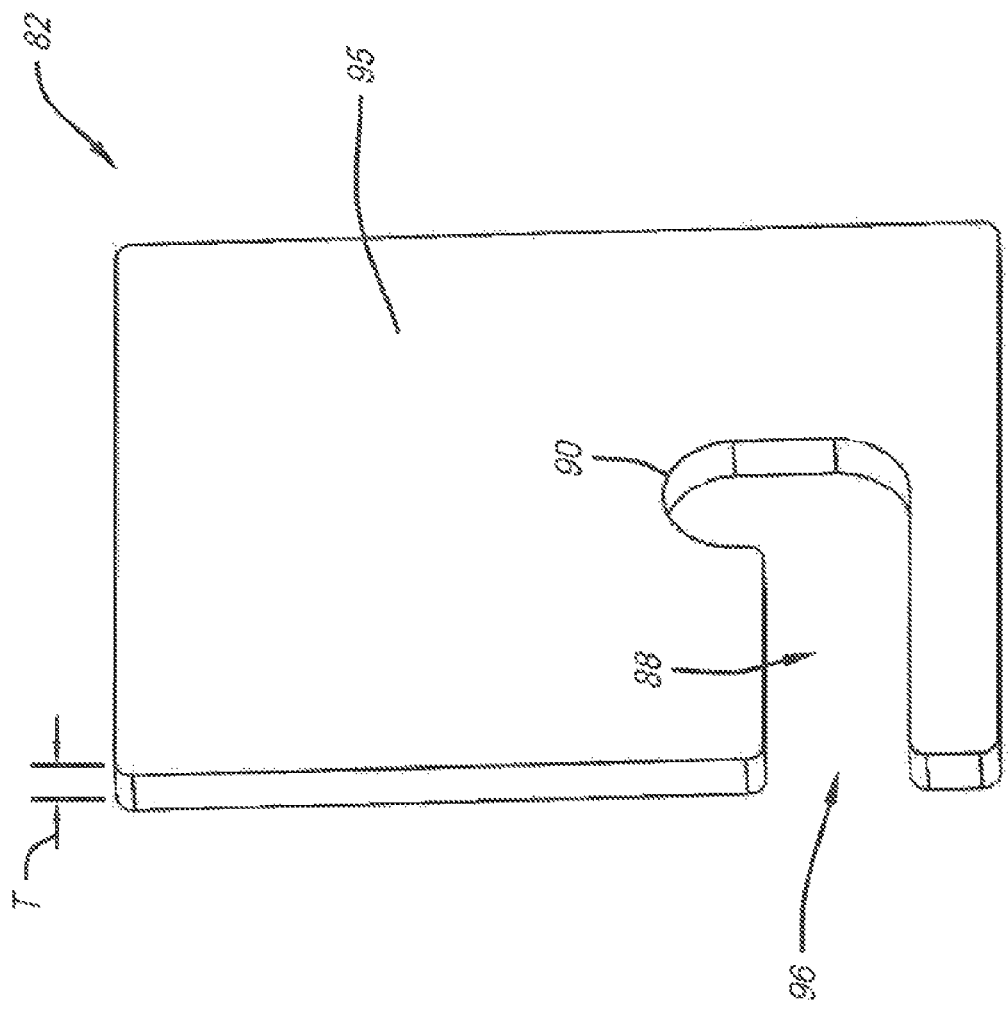
FIG. 16 is a perspective view of a shim.

A perspective view of shim 82 is shown in FIG. 16. It is appreciated that shims 82 and 84 may have the same profile but different thicknesses. Shim 82, as shown here, has a thickness T whereas, shim 84 may have a thinner thickness T′ (see, FIG. 8). As shown herein, shim 82 includes a facing surface 95 size to abut up against other shims or the flanges as previously discussed. A slot opening 96 is disposed through an outer periphery of shim 82, leading to fastener slot 88 and cut out 90. In the illustrative embodiment, slot opening 96 is located at the side of shim 82 so that same can be slid sideways into gap 86, between clamp mount 50 and clamp back 58 (see, FIG. 7). While clamp assembly 46 is hanging on clamp slot 48 of rail 40 prior to tightening clamp assembly 46, shim 82 (and/or shim 84) may be slid into gap 86, such that clamping fastener 60 may be disposed into fastener slot 88 through slot opening 96, and set into cut out 90. The shim 82 (and/or 84) may hang on clamping fastener 60 at cut out 90, while determining whether additional or alternate shims are needed to be placed in gaps 34 and/or 36. In other words, cut out 90 assists in keeping the shim in place during the installation process of rail 40.

Figure 17:
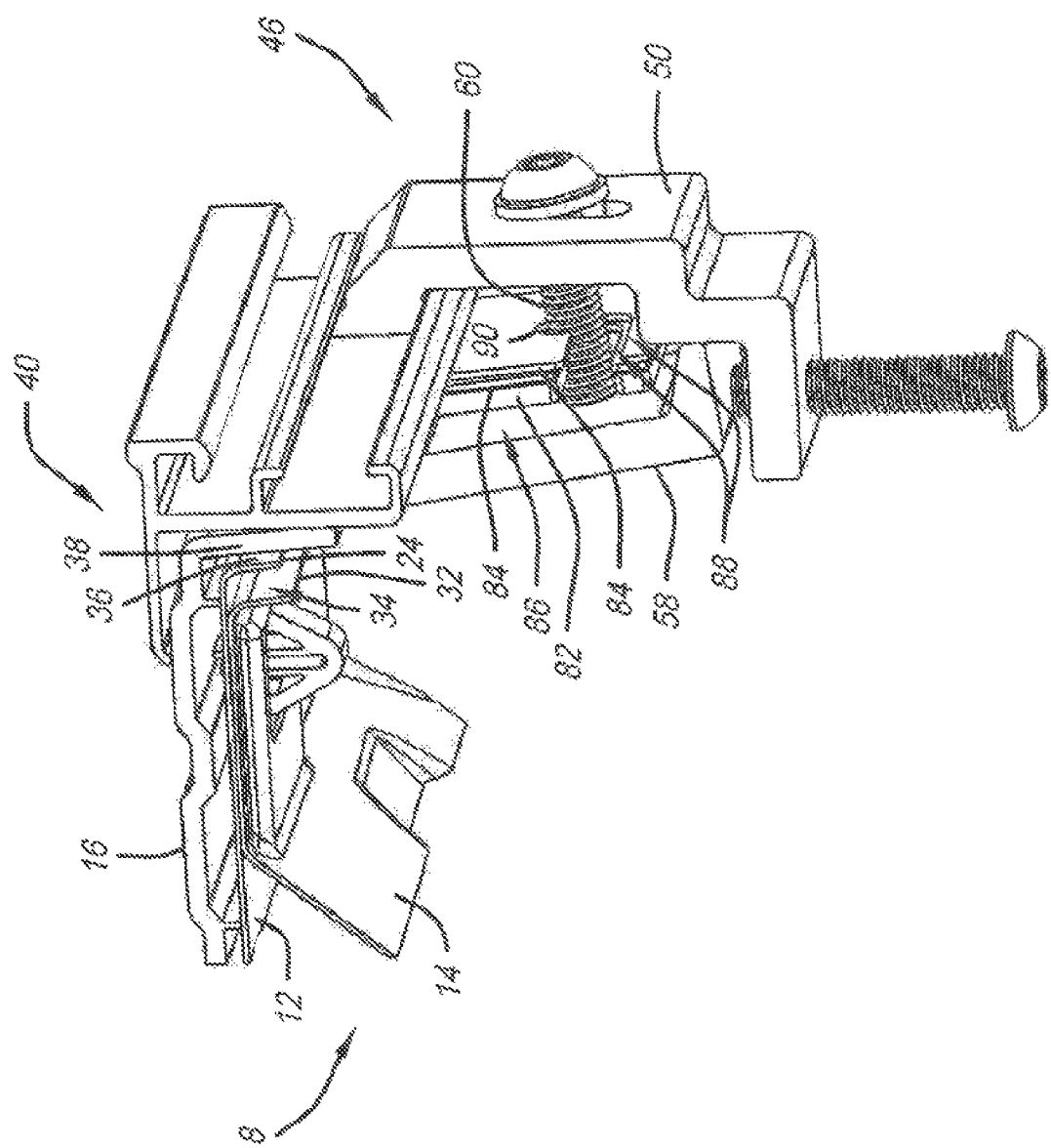
FIG. 17 is a perspective sectional detail view of a portion of a cargo box sidewall with a rail coupled thereto by a clamp assembly.

A perspective sectional detail view of the portion of sidewall 8 with rail 40 coupled thereto with clamp assembly 46 is shown in FIG. 17. This view shows outer sheet 12 and inner sheet 14 forming flanges 24 and 32, respectively. Sidewall cap 16 is also shown forming flange 38. Gaps 34 and 36 are shown located between flanges 32 and 24, as well as flanges 24 and 38, respectively. To accommodate for those gaps 34 and 36, shims 82 and 84 are placed within gap 86 between clamp mount 50 and clamp back 58. This view demonstrates how clamping fastener 60 is disposed within fastener slots 88 of all shims 82 and 84 and seated within cut out 90, also disposed in all of shims 82 and 84. With shims 82 and 84 seated on clamping fastener 60 within gap 86 they are likewise positioned to fill gaps 34 and 36, such as that shown in FIG. 8. If it happens that gaps 34 and 36 were not filled by the shown configuration of shims 82 and 84, one or more of shims 82 and/or 84 may be removed by pulling it from clamping fastener 60 through slot 88 to be replaced by a different shim via the same process.

Figure 18:
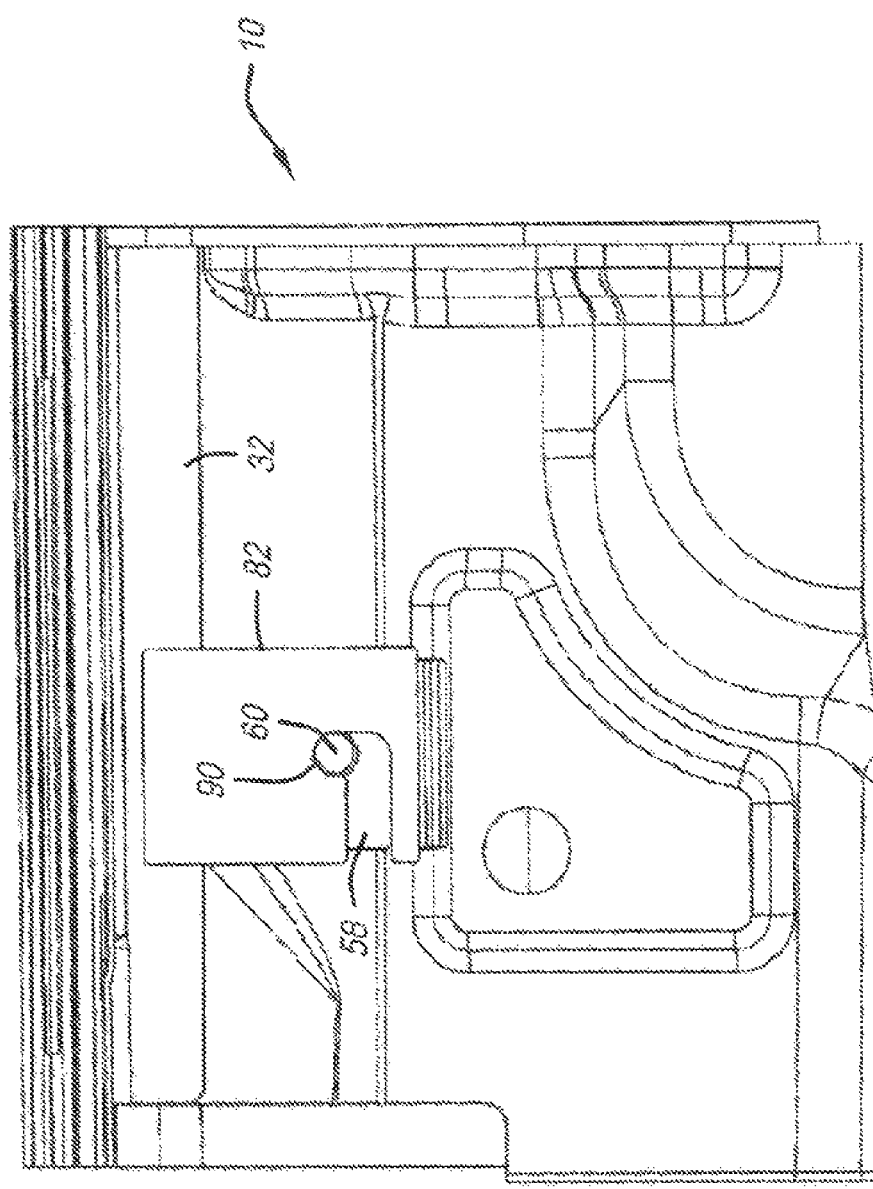
FIG. 18 is a detail facing view of a portion of a cargo box sidewall with a shim hung on a clamp fastener from a clamp assembly.
Figure 19:
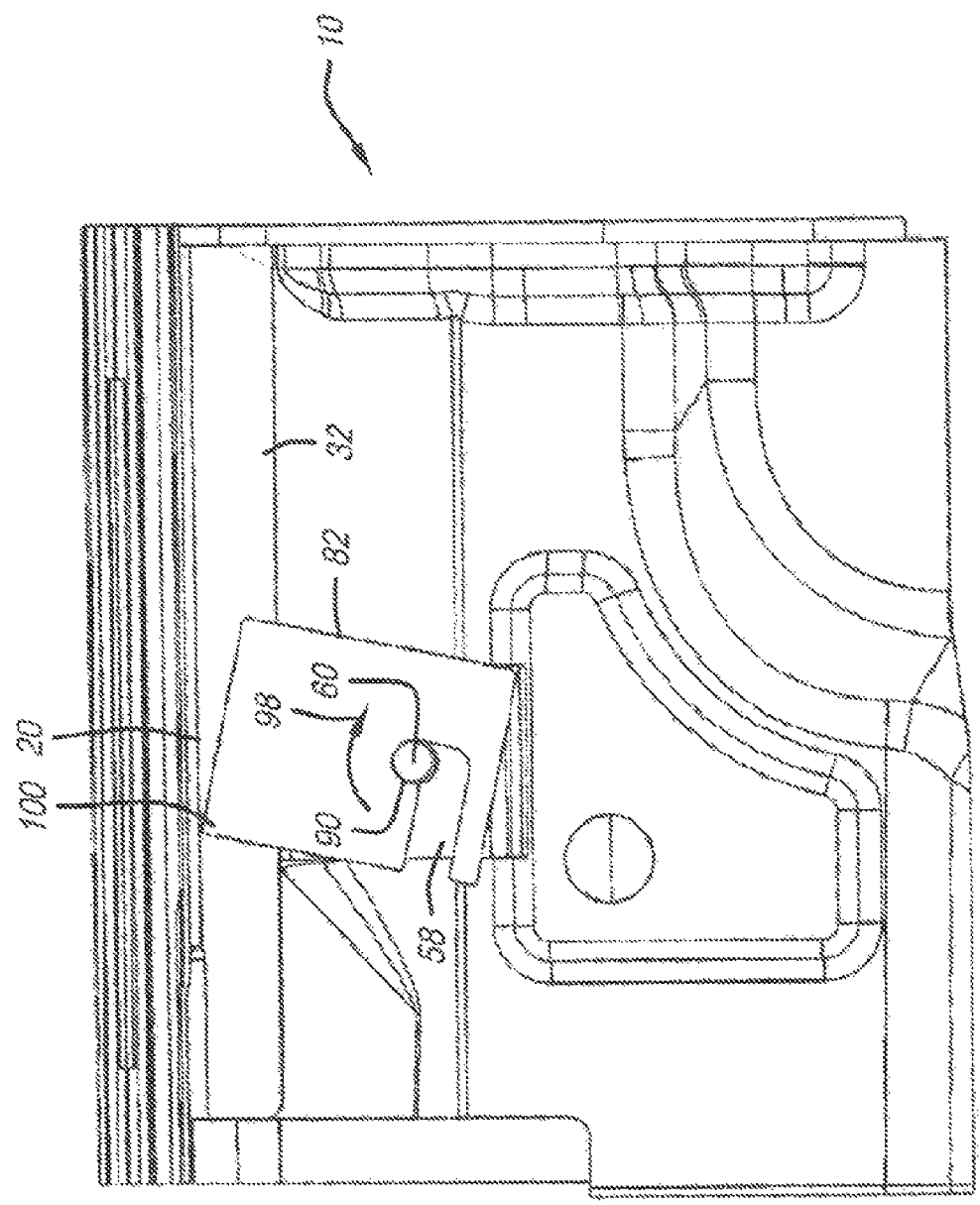
FIG. 19 is another detail facing view of a portion of a cargo box sidewall with a shim hung on a clamp fastener from a clamp assembly.

Another illustrative embodiment with respect to shims 82 and 84 are their polygonal shape. A detail facing view of the portion of sidewall 10 that shows shim 82 hung on clamping fastener 60 at cut out 90 is shown in FIGS. 18 and 19. With respect to FIG. 18, shim 82 is located adjacent clamp back 58, as well as flange 32. An issue that such clamps have when they are being tightened via a rotating fastener, such as clamping fastener 60, is that the clamps may be urged to rotate as well. Because shim 82 (and/or shim 84) is sitting on clamping fastener 60 at cut out 90, there is potential that such contact may urge the shim to rotate, such as in direction 98 as shown in FIG. 19. If shim 82 (and/or shim 84) rotates in direction 98 as clamping fastener 60 also rotates in direction 98, corner 100 of shim 82 (and/or shim 84) will abut the underside of top surface 20 of outer sheet 12. This will limit rotation of shim 82 (and/shim 84). By limiting this rotation, the shim will not be rotated out of its positioning between the sidewall flanges, thereby staying in place sufficiently to provide the structure needed for clamp assembly 46. It is appreciated that such shim corners such as corner 100 may exist on opposing sides of shim 82 (and/or shim 84), such that it can be prevented from rotating in the opposite direction if need be. Limiting the shim's ability to rotate while tightening clamp assembly 46 further aids in the ease of adding shims to same.

Figure 20:
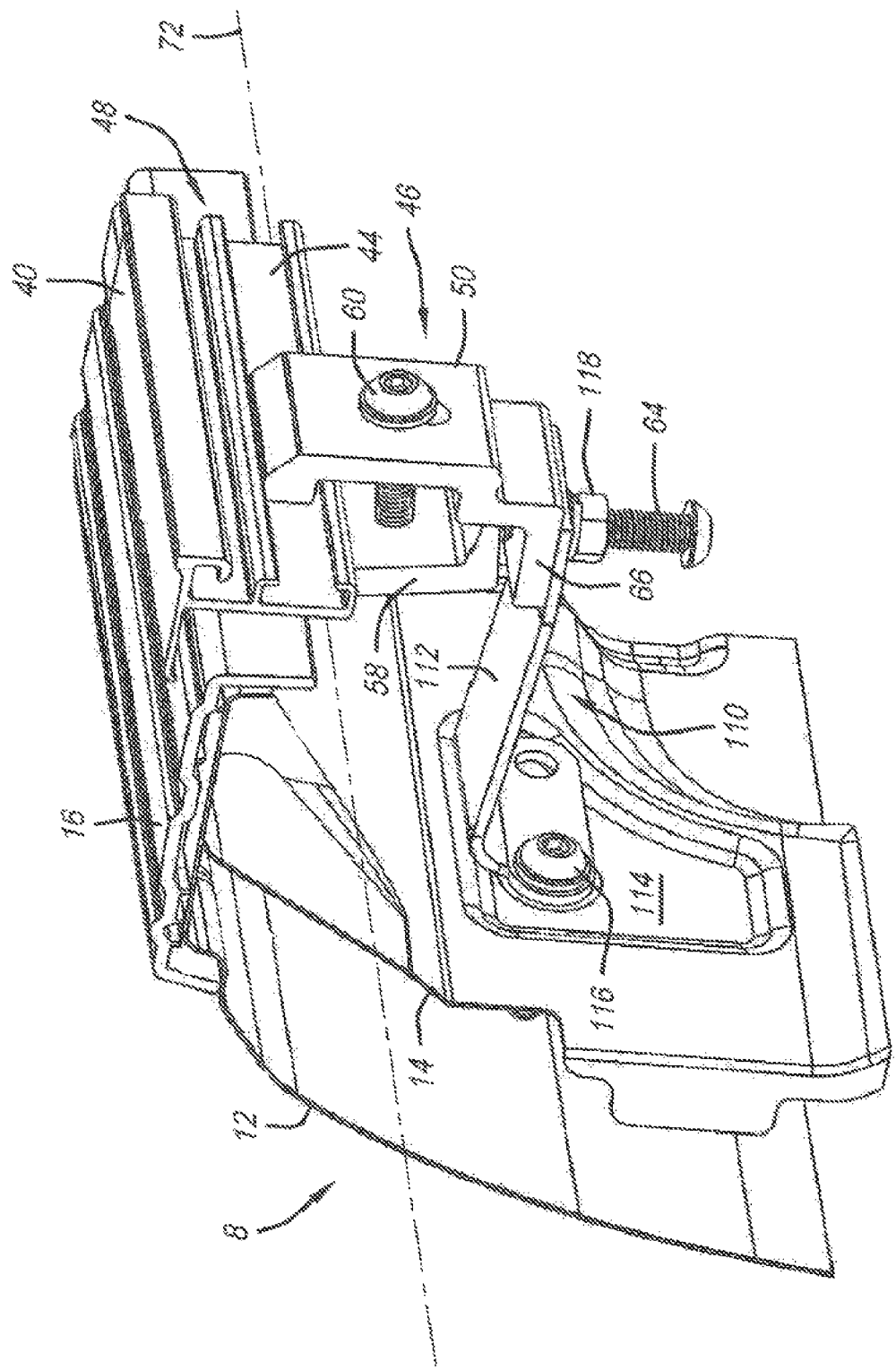
FIG. 20 is a perspective detail view of a portion of a cargo box sidewall, along with a portion of a rail and a clamp assembly, as well as an illustrative embodiment of a clamp bracket assembly.

Another illustrative embodiment of the present disclosure provides a support bracket that selectively attaches to the clamp assembly and the cargo box to prevent the clamp assembly from rotating about the rail because of the same construction issues previously described. A perspective detail view of a portion of sidewall 8 composed of outer sheet 12 and inner sheet 14 along with sidewall cap 16 is shown in FIG. 20. Additionally, rail 40 from a tonneau cover assembly is placed on sidewall cap 16. Clamp assembly 46 is also shown fitted into clamp slot 48 of clamp bracket 44 on rail 40. A distinction here, however, is that a clamp bracket assembly 110 is shown fixed to both clamp assembly 46 and inner sheet 14. A typical feature with inner sheets (such as inner sheet 14) of pickup truck sidewalls is they have holes disposed therethrough at various locations along sidewall 8 (or sidewall 10). A variety of reasons may exist for having these holes, particularly in inner sheet 14. But because these holes are a relatively common occurrence they can be employed to hold a clamp assembly so it better secures the rail onto the cargo box sidewall. This can be particularly useful in circumstances where the inner flanges of the steel sheets that formed the sidewall have gaps between them for tolerance run out as previously described.

As is appreciated in this view, clamp bracket assembly holds clamp assembly 46 so it cannot pivot about longitudinal axis 72 that extends generally along the length of rail 40. As illustratively shown, clamp bracket assembly 110 includes a bracket member 112 extending from surface 114 of inner sheet 14. A fastener 116 is disposed through inner sheet 14 and bracket member 112 to secure same to inner sheet 14. Bracket member 112 extends to clamp base 66 of clamp mount 50 and attaching thereto for limiting movement of clamp mount 50. It is appreciated that clamp back 58 secures to clamp mount 50 via clamping fastener 60 as previously described in prior embodiments. It will be appreciated by the skilled artisan upon reading this disclosure that bracket member 112 being fixed at a point on sidewall 8 and to clamp assembly 46 limits movement of same.

Also shown here is adjustment screw 64 that can receive nut 118 which assists in securing bracket member 112 to clamp base 66. In particular, bracket member 112 may include a hole 124 disposed therethrough (see, FIG. 22) that receives adjustment screw 64, which is otherwise a standard feature on this particular clamp assembly 46 independent of clamp bracket assembly 110. This illustrative configuration secures bracket member 112 to clamp assembly 46. With respect to disclosure of clamp bracket assembly 110 herein relative to sidewall 8, it is appreciated that such clamp bracket assembly 110 may be used in the same way on sidewall 10. Additionally, clamp bracket assembly 110 may be used at various locations along rail 40 as needed and/or as holes are either made or available through inner sheet 14.

Figure 21:
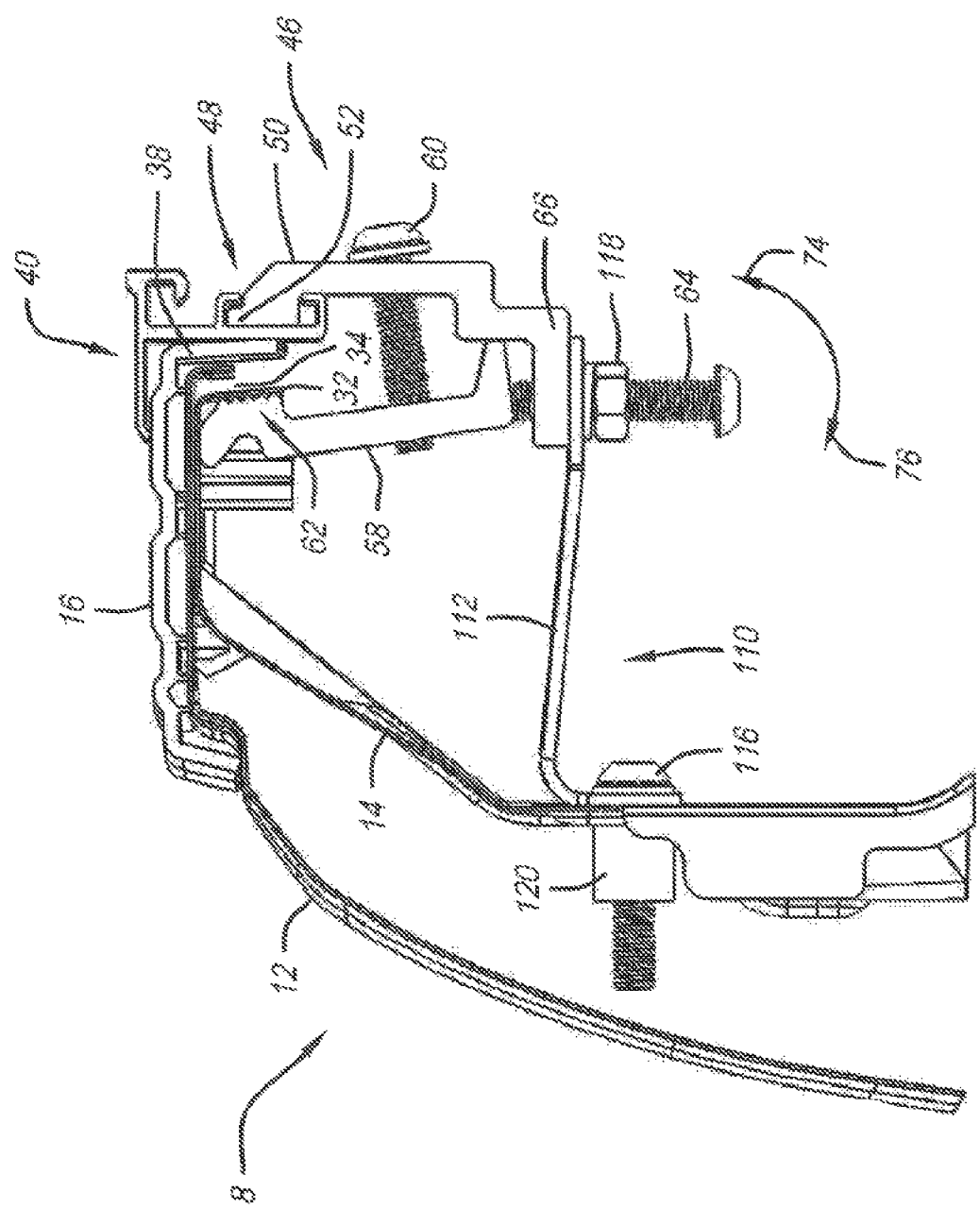
FIG. 21 is an end sectional detail view of a portion of a cargo box sidewall that includes a clamp, rail, and clamp bracket assembly.

An end sectional detail view of a portion of sidewall 8, including outer sheet 12, inner sheet 14, and sidewall cap 16 is shown in FIG. 21. Depicted is clamp assembly 46 clamping rail 40 to sidewall 8. Particularly, gripping surface 62 of clamp back 58 engages flange 32 of inner sheet 14 while upward extending flange 52 of clamp mount 50 is fitted into clamp slot 48 in rail 40 to hold same against flange 38 of sidewall cap 16. When clamping fastener 60 is rotated, clamp mount 50 and clamp back 58 are drawn together to clamp rail 40 onto sidewall 8 as shown. Adjustment screw 64 may be rotated to raise and lower clamp back 58 with respect to clamp mount 50 so gripping surface 62 can be positioned against flange 32. As previously discussed, however, because of gaps between flanges such as gap 34 as previously discussed, this clamping arrangement alone may result in clamp assembly 46 being able to be pried out away from flange 32 and clamp slot 48. By employing clamp bracket assembly 110, however, clamp assembly 46 is not pivotable in directions 74 or 76 that may otherwise pry clamp assembly 46 from sidewall 8.

This view shows bracket member 112 fastened to both inner sheet 14 via fastener 116 and to clamp base 66 via adjustment screw 64 with nut 118. In this illustrative embodiment, a bushing 120 may be disposed through a hole 122 (see, FIG. 22) in inner sheet 14 and through surface 114 to receive fastener 116. Again, having bracket member 112 extending between sidewall 8 and clamp assembly 46 and secured at those locations, clamp assembly 46 cannot rotate in direction 74 and, thus, pry out of clamp slot 48 of rail 40.

Figure 22:
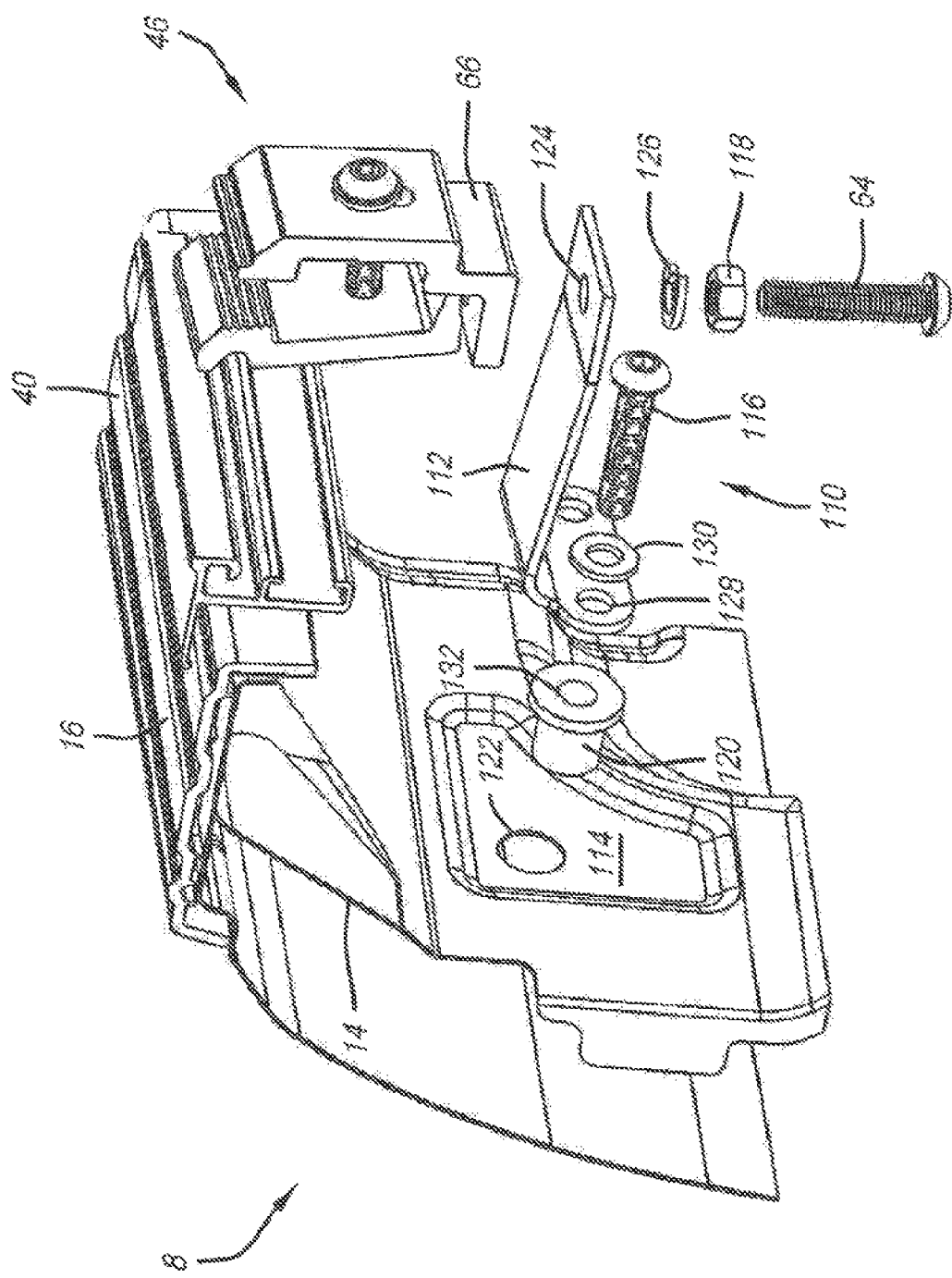
FIG. 22 is a sectional detail view of a portion of a cargo box sidewall with the rail, clamp assembly, and clamp bracket assembly, wherein the clamp bracket assembly is shown in exploded view.

A sectional detail exploded view of a portion of sidewall 8 with rail 40, clamp assembly 46, and clamp bracket assembly 110 is shown in FIG. 22. This view further depicts the illustrative components of clamp bracket assembly 110. For instance, bracket member 112 is shown including hole 124 at one side that allows receipt of adjustment screw 64 that threadedly secures to clamp base 66 with nut 118 and illustrative lock washer 126. Illustratively, another side of bracket member 112 may be bent transversely, as needed, so that bore 128 may be disposed therethrough in order to receive fastener 116. Illustratively, a washer 130 may optionally be used between fastener 116 and bore 128. Bushing 120 may be sized to have an outer periphery that friction fits or otherwise attaches to hole 122 disposed through inner sheet 14. A bore 132 disposed through bushing 120 receives fastener 116 so as to secure bracket member 112 against surface 114 of inner sheet 14.

Figure 23:
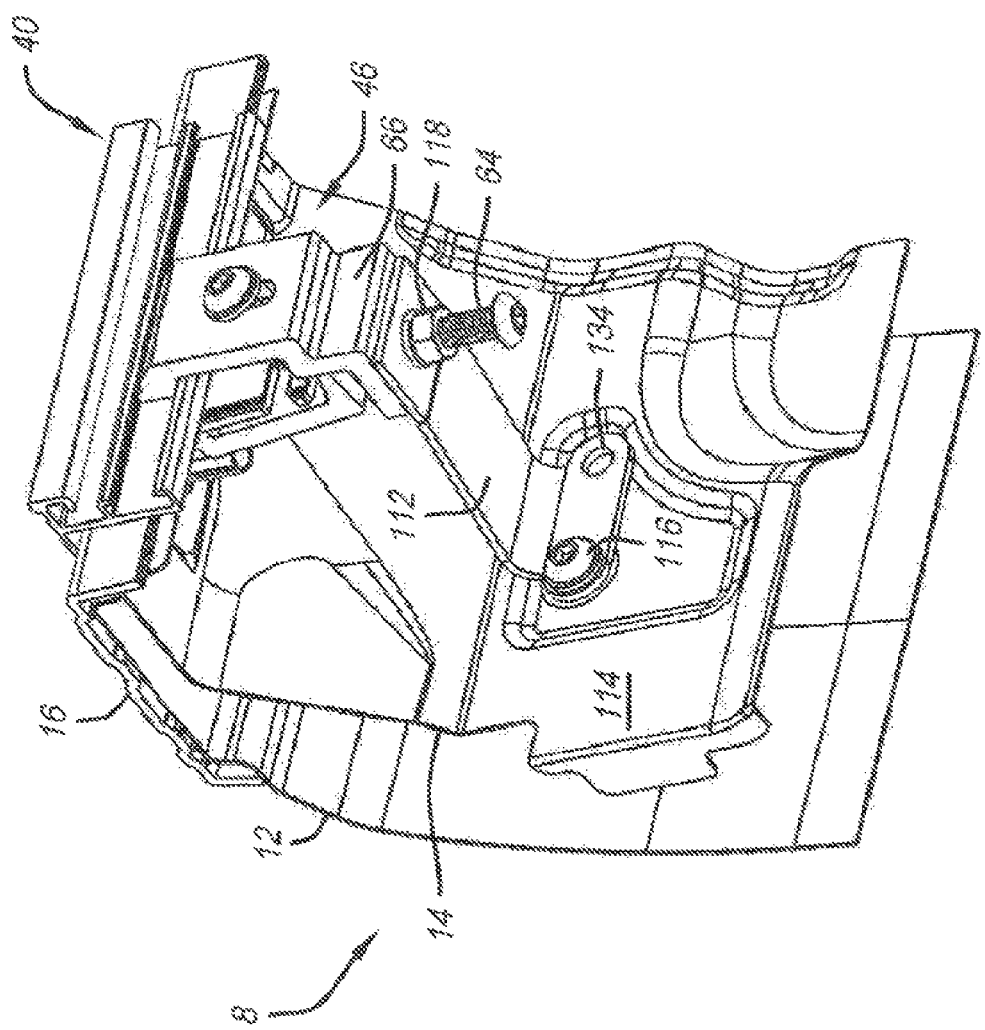
FIG. 23 is an upward-looking underside detail sectional perspective view of a portion of a cargo box sidewall with a portion of a rail attached thereto via a clamp assembly and showing a clamp bracket assembly.

An upward-looking underside detail sectional perspective view of sidewall 8 with rail 40 attached thereto via clamp assembly 146 is shown in FIG. 23. This view further shows bracket member 112 attached at clamp base 66 of clamp mounts 50 via adjustment screw 64 and nut 118. It is appreciated how bracket member 112 extends from surface 114 of inner sheet 14 to hold clamp assembly 46 in place. It is appreciated that bracket member 112 may include an additional bore 134 to provide the installer options to insert fastener 116 for purposes of aligning bracket member 112 with a hole disposed through inner sheet 14. Furthermore, one or more sides or portions of bracket member 112 may be bent transverse so as also to accommodate holes at various locations on inner sheet 14.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features. It should also be appreciated that, to the extent any subject matter disclosed in this non-provisional patent document conflicts with the priority application, the disclosure from this non-provisional patent document controls.

What is claimed is:

1. At least one shim for use with a tonneau cover assembly, the at least one shim comprising:
    a first thickness;
    a slot disposed through the first thickness and extending from an outer edge of the at least one shim;
    wherein the at least one shim is configured to be selectively positionable adjacent at least one flange of a sidewall of a pickup truck cargo box;
    wherein the at least one shim is configured to be engageable with a clamp that is engageable with a tonneau cover rail;
    wherein the slot of the at least one shim is configured to receive a clamp fastener of the clamp; and
    wherein the at least one shim is at least partially supportable by the clamp fastener when the clamp is in an unclamped condition.

2. The at least one shim of claim 1, wherein the at least one shim includes a second shim located adjacent to the at least one shim, wherein the second shim has a second thickness that is different than the first thickness.

3. The at least one shim of claim 1, wherein the at least one shim is configured to be located within a space formed between a clamp back and a clamp mount of the clamp.

4. The at least one shim of claim 1, wherein the at least one shim includes a plurality of shims, wherein each shim of the plurality of shims includes a slot disposed there through extending from an outer edge of the each shim of the plurality of shims.

5. The at least one shim of claim 4, wherein the plurality of shims are configured to occupy multiple cavities located between multiple flanges of the sidewall.

6. The at least one shim of claim 3, wherein at least a portion of the at least one shim is configured to be located adjacent the clamp back and a flange located on an opposite side of the at least one shim from the clamp back.

7. The at least one shim of claim 2, wherein the first thickness of the at least one shim is greater than the second thickness of the second shim.

8. The at least one shim of claim 2, wherein the first thickness of the at least one shim is less than the second thickness of the second shim.

9. The at least one shim of claim 1, further comprising a cut out disposed through the at least one shim that extends from the slot.

10. The at least one shim of claim 9, wherein the cut out extends transverse from the slot.

11. At least one shim for use with a tonneau cover assembly, the at least one shim comprising:
   a first thickness;
   wherein the at least one shim is configured to be selectively positionable adjacent at least one flange of a sidewall of a pickup truck cargo box;
   a slot disposed through the first thickness and extending from an outer edge of the at least one shim; and
   a cut out disposed through the at least one shim that extends from the slot;
   wherein the at least one shim is further configured to be engageable with a clamp that is engageable with a tonneau cover rail.

12. The at least one shim of claim 11, wherein the at least one shim includes a second shim located adjacent to the at least one shim, wherein the second shim has a second thickness that is different than the first thickness.

13. The at least one shim of claim 11, wherein the at least one shim includes a plurality of shims, wherein each shim of the plurality of shims includes a slot disposed there through extending from an outer edge of the each shim of the plurality of shims.

14. The at least one shim of claim 11, wherein the slot of the at least one shim is configured to receive a clamp fastener of the clamp.

15. The at least one shim of claim 14, wherein the at least one shim is at least partially supportable by the clamp fastener when the clamp is in an unclamped condition.

16. The at least one shim of claim 11, wherein at least a portion of the at least one shim is configured to be located adjacent a clamp back of the clamp and a flange of the sidewall located on an opposite side of the at least one shim from the clamp back.

17. The at least one shim of claim 12, wherein the first thickness of the at least one shim is greater than the second thickness of the second shim.

18. The at least one shim of claim 12, wherein the first thickness of the at least one shim is less than the second thickness of the second shim.

19. At least one shim for use with a tonneau cover assembly, the at least one shim comprising:
   a first thickness;
   a slot disposed through the first thickness and extending from an outer edge of the at least one shim;
   wherein the at least one shim is further configured to be engageable with a clamp that is engageable with a tonneau cover rail;
   wherein the slot of the at least one shim is configured to receive a clamp fastener of the clamp; and
   wherein the at least one shim is at least partially supportable by the clamp fastener when the clamp is in an unclamped condition.

* * * * *